US012302917B2

(12) United States Patent
Lim et al.

(10) Patent No.: US 12,302,917 B2
(45) Date of Patent: May 20, 2025

(54) EMULSIFIED COMPOSITION CONTAINING ALLULOSE

(71) Applicant: SAMYANG CORPORATION, Seoul (KR)

(72) Inventors: Hye Jin Lim, Suwon-si (KR); Kyung-Hun Ryu, Seongnam-si (KR); Bong Chan Kim, Seoul (KR); Yong-In Kim, Yongin-si (KR); Il Seo, Gwangju-si (KR); Seung Mi Lee, Hwaseong-si (KR); Tae-Chul Han, Yongin-si (KR); Choong Woo Nam, Seoul (KR)

(73) Assignee: SAMYANG CORPORATION, Seoul (KR)

( * ) Notice: Subject to any disclaimer, the term of this patent is extended or adjusted under 35 U.S.C. 154(b) by 411 days.

(21) Appl. No.: 17/772,665

(22) PCT Filed: Oct. 29, 2020

(86) PCT No.: PCT/KR2020/014912
§ 371 (c)(1),
(2) Date: Apr. 28, 2022

(87) PCT Pub. No.: WO2021/086054
PCT Pub. Date: May 6, 2021

(65) Prior Publication Data
US 2022/0369659 A1    Nov. 24, 2022

(30) Foreign Application Priority Data

Oct. 29, 2019   (KR) .................. 10-2019-0135931
Oct. 29, 2019   (KR) .................. 10-2019-0135932

(51) Int. Cl.
*A23C 11/04*    (2025.01)
*A23C 11/02*    (2006.01)
(Continued)

(52) U.S. Cl.
CPC .............. *A23C 11/04* (2013.01); *A23C 11/02* (2013.01); *A23C 13/125* (2013.01); *A23L 27/35* (2016.08);
(Continued)

(58) Field of Classification Search
CPC ........... A23C 11/04; A23C 11/02; A23C 9/18; A23C 11/00–106; A23C 13/125;
(Continued)

(56) References Cited

U.S. PATENT DOCUMENTS 4,438,147 A      3/1984   Hedrick, Jr.
6,129,943 A *   10/2000   Zeller .................. A23C 11/045
                                                                  426/570
(Continued)

FOREIGN PATENT DOCUMENTS

JP    2000-506022    5/2000
JP    2014-007963    1/2014
(Continued)

OTHER PUBLICATIONS

Abstract for WO 2018124703A1 (Year: 2018).*
(Continued)

*Primary Examiner* — Drew E Becker
(74) *Attorney, Agent, or Firm* — LEX IP MEISTER, PLLC

(57) ABSTRACT

The present disclosure relates to an emulsified food composition which includes a saccharide and an oil, and achieves good flavor expression and saccharide reduction, and a method for preparing same.

11 Claims, 6 Drawing Sheets

(51) Int. Cl.
 *A23C 13/12* (2006.01)
 *A23L 27/00* (2016.01)
 *A23L 27/30* (2016.01)
 *A23L 29/10* (2016.01)
 *A23L 29/30* (2016.01)

(52) U.S. Cl.
 CPC ............... *A23L 27/80* (2016.08); *A23L 29/10* (2016.08); *A23L 29/30* (2016.08); *A23L 29/35* (2016.08)

(58) Field of Classification Search
 CPC .... A23L 29/10; A23L 27/30–39; A23L 27/80; A23L 29/30–39; A23L 35/10; A23V 2200/132; A23V 2200/3322; A23V 2250/24–266
 See application file for complete search history.

(56) References Cited

U.S. PATENT DOCUMENTS

| | | | | |
|---|---|---|---|---|
| 2001/0041211 | A1* | 11/2001 | Beeson | A23G 9/52 426/564 |
| 2013/0266718 | A1* | 10/2013 | van der Vegt | A23C 11/00 426/656 |
| 2016/0058027 | A1* | 3/2016 | He | A23F 3/30 426/588 |
| 2016/0302463 | A1* | 10/2016 | Woodyer | A21D 2/36 |
| 2018/0271112 | A1* | 9/2018 | Barkalow | A23G 3/42 |
| 2019/0029299 | A1* | 1/2019 | Bak | A23L 27/88 |
| 2019/0269140 | A1 | 9/2019 | Seo et al. | |
| 2019/0281848 | A1* | 9/2019 | Koh | A23C 9/127 |
| 2019/0289869 | A1* | 9/2019 | Lee | A23C 11/02 |
| 2019/0364918 | A1* | 12/2019 | Ota | A23F 5/465 |
| 2020/0054049 | A1* | 2/2020 | Kim | A23L 7/126 |
| 2021/0120855 | A1* | 4/2021 | Park | A23G 9/34 |
| 2021/0186061 | A1* | 6/2021 | Dupas-Langlet | A23C 11/00 |
| 2021/0244057 | A1* | 8/2021 | Kim | A23L 29/212 |
| 2021/0289809 | A1* | 9/2021 | Lim | A23F 5/243 |
| 2022/0000133 | A1* | 1/2022 | Fu | A23L 9/24 |
| 2022/0046969 | A1* | 2/2022 | Kennison | A23L 2/60 |

FOREIGN PATENT DOCUMENTS

| | | |
|---|---|---|
| JP | 2014-036645 | 2/2014 |
| JP | 2014-204697 | 10/2014 |
| JP | 2015-023803 | 2/2015 |
| JP | 2017-528150 | 9/2017 |
| KR | 10-2018-0075423 | 7/2018 |
| KR | 10-2018-0075424 | 7/2018 |
| KR | 10-2018-0105537 | 9/2018 |
| KR | 10-2019-0048712 | 5/2019 |
| KR | 10-2019-0049534 | 5/2019 |
| KR | 10-2019-0049564 | 5/2019 |
| WO | 2012-050439 | 4/2012 |
| WO | 2014-084094 | 6/2014 |

OTHER PUBLICATIONS

KIPO, PCT Search Report & Written Opinion of PCT/KR2020/014912 dated Feb. 1, 2021.
JPO, Office Action of JP 2022-525219 dated Jun. 20, 2023.

* cited by examiner

[FIG. 1]
Sample 1
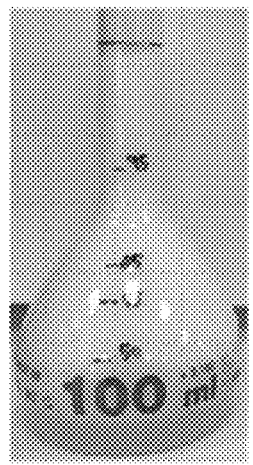
Sample 2
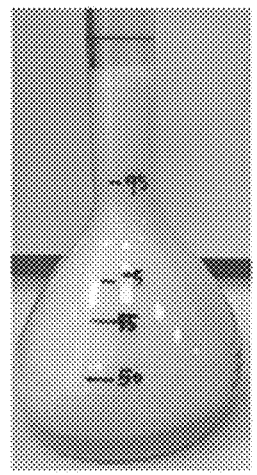
Sample 3
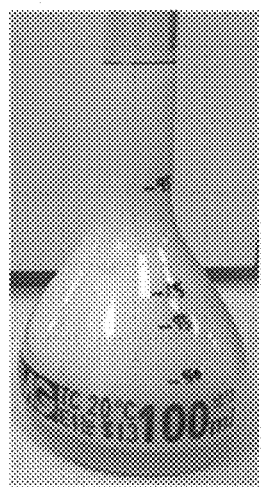
Sample 4
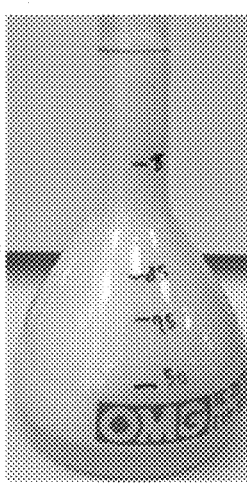

[FIG. 2]
Sample 1
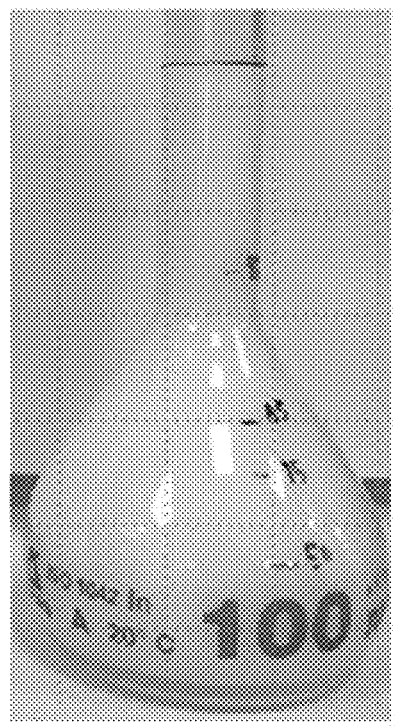

[FIG. 3]
Comparative Sample 1
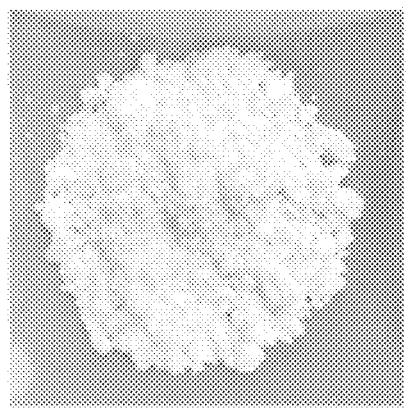
Example 1-Sample 1
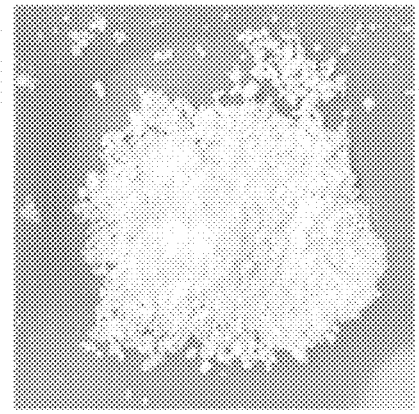
Example 1-Sample 2
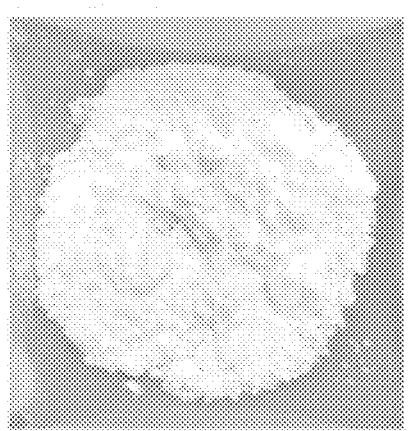
Example 1-Sample 3
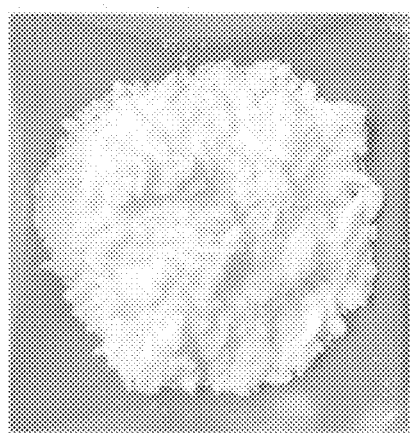

[FIG. 4]
Comparative Sample 1  Sample 4 

[FIG. 5]
Comparative Sample 1
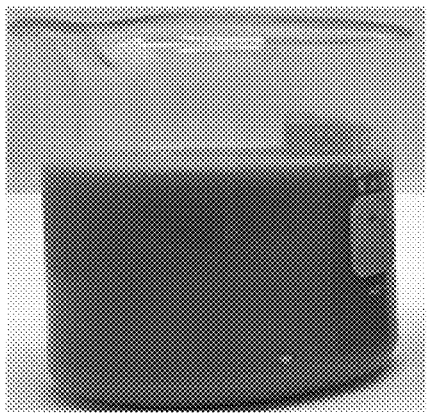
Example 1-Sample 1
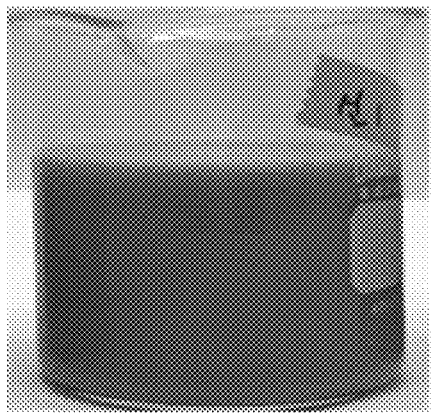
Example 1-Sample 2
Example 1-Sample 3
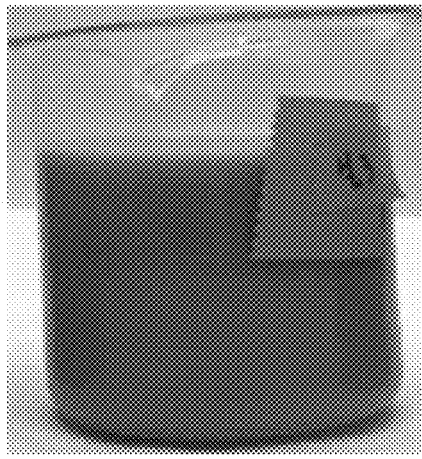

[FIG. 6]
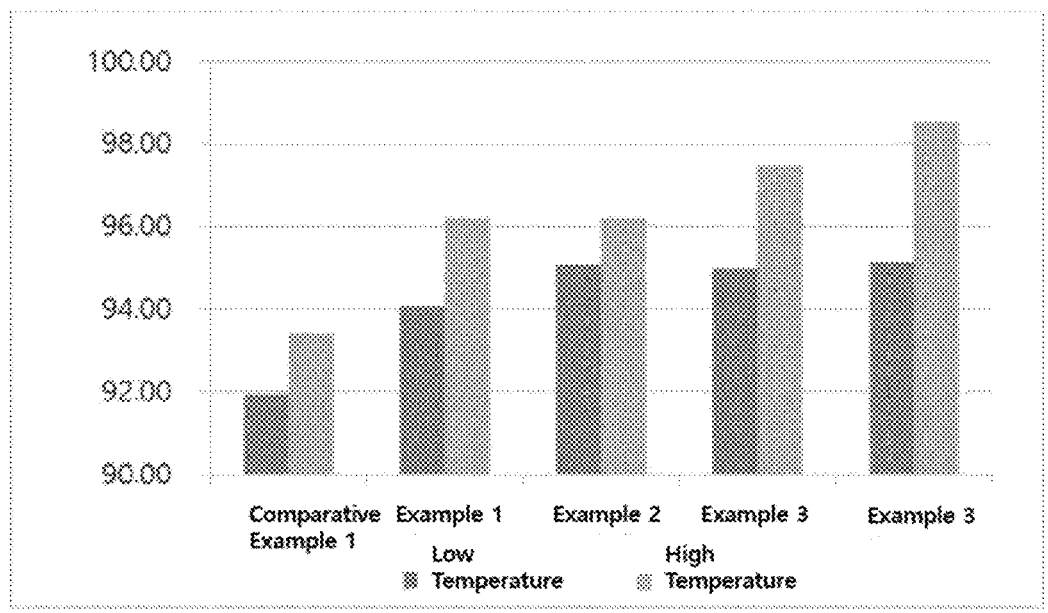

EMULSIFIED COMPOSITION CONTAINING ALLULOSE

TECHNICAL FIELD

The present disclosure relates to an emulsified food composition which comprises a saccharide and an oil, and achieves good flavor expression and sugar reduction, and a method for preparing the same. The emulsified food composition can be variously applied as food additives, beverage additives, food, and the like, and improves emulsion stability of food and achieves saccharide reduction and low calorie by using allulose as a saccharide.

BACKGROUND ART

Recently, processed foods with a high sugar content have been criticized due to their association with various adult diseases such as obesity. Due to a rise in interest in health and a sugar reduction campaign, interest in low-calorie, low-sugar content products is increasing. As one of solutions to solve adult diseases, obesity and the like, which have become a problem in the world recently, various policies for reducing sugar consumption of their own nation in many countries including Korea have been implemented. The saccharide includes monosaccharide or disaccharide such as glucose (DPI) and maltose (DP2), specifically, five types of sugars, such as sugar, fructose, glucose, maltose, and lactose.

Consumers are gradually increasing their tendency to purchase products while checking the saccharide content of the nutritional component list of products. Thus, in order to lower the saccharide content, processed food manufacturers are struggling to reduce the amount of ion starch syrup, malt starch syrup, and the like, which have a high saccharide content. In consumer products, the sum of monosaccharide and disaccharide is indicated as a saccharide.

However, these substances are used as extenders, sweeteners, texture improvers, and viscosity modifiers of products, and occupy a very large percentage, so that they are difficult to replace. In particular, polymers such as gum and pectin can be used for viscosity adjustment, but the cost may be high.

As the harmfulness of sugar continues to be revealed, problems have been raised. Specifically, excessive intake of sugar is pointed out as a major cause of various lifestyle diseases such as obesity and diabetes, etc. in addition to cavities, and thus the necessity of developing sweeteners which can replace it has emerged all over the world. Accordingly, there is a continuous need for the development of an improved alternative sweetener, not a sweetener that has a sweetness enough to replace sugar, is low in calories, and blocks excessive intake of sugar simply by inhibiting the absorption of sugar.

Allulose is one of the saccharides recently highlighted as a saccharide that can replace sugar or fructose, etc. as a functional sweetener. Allulose is contained in trace amounts in molasses or isomerized sugar, and is a kind of rare sugar that can be enzymatically produced from D-fructose by epimerase, and is expected to have physiological functions such as antioxidant. Moreover, although the sweetness reaches 60 to 70% of sugar, it has almost no calories and is highly soluble, and so it is expected to be applicable as various foods.

Meanwhile, it is urgent to develop a mixed saccharides that achieves a high viscosity while reducing the sugar of the starch syrup itself. In order to solve these problems, a sugar syrup having a substantially lower sugar content but having sweetness and low sugar content similar to existing products is needed.

The conventional powdery emulsion composition contains an excess of oil and saccharide and thus has a high calorie and a high sugar content. Thus, there is a high demand for a low-calorie emulsion composition with reduced saccharide. Additionally, when the liquid emulsion composition makes as a powder, the water content of the powder increases due to the water content of the product or the water content of the outside air, which promotes rancidity of the fat, and thus the quality and storage stability of the product tends to deteriorate. Particularly, the technique of powdering liquid products, such as spray drying, requires powdering with a water content of 5 to 10% or less, but it absorbs water by the humidity of the manufacturing environment or the humidity of the storage environment, which adversely affects the quality. Such deterioration in quality is a major factor that shortens the expiration date of a product, which also causes a problem of lowering the distribution efficiency of the product. Further, when low DE(dextrose equivalent) starch syrup is used as a sugar in the emulsion composition, hygroscopicity tends to increase, which cause problems such as emulsion stability and storage stability, and further causes a problem that the saccharide content is high.

Thus, there is an increasing demand for saccharides and an emulsion composition including the same that achieve sweetness similar to existing products while reducing saccharides such as starch syrup contained in the emulsion composition, and is used in an emulsion composition that can be easily powdered.

Allulose syrup has a sweetness degree similar to sugar and has almost zero calories, so it is attracting a considerable attention as a sugar substitute. However, the allulose syrup has a problem of low viscosity compared to a starch syrup used as a universal sweetener, and thus it is not easy to adjust the amount added. Allulose crystals are difficult to be powdered as a single component, which causes a problem that they are not suitable for a powdering process. Allulose is limited in its application in the case of concentrated syrup and thus the demand for crystals and powders is high, but allulose has low crystallinity and is difficult to crystallize. Even when allulose is produced by a biological method using an allulose converting enzyme or a strain producing the enzyme, due to the low conversion rate, it is necessary to increase the purity of allulose and then crystallize it. Accordingly, when the purpose is to industrially utilize D-allulose, there are still unresolved problems in the purification process, purification yield, crystallization yield, and the like.

DETAILED DESCRIPTION OF THE INVENTION

Technical Problem

An object of the present disclosure is to provide an emulsified food composition which comprises a saccharide and an oil, and achieves good flavor expression and saccharide reduction, and a method for preparing same. The emulsified food composition can be variously applied as food additives, beverage additives, food, and the like.

Technical Solution

According to one embodiment of the present disclosure, there is provided an emulsion composition comprising a vegetable oil, a saccharide and an emulsifier, wherein the saccharide comprises allulose.

As used herein, the term "emulsion composition" or "emulsified composition" refers collectively to emulsion compositions, and such an emulsion composition refers to a composition arbitrarily emulsified to adjust an use of processed products applied with oil, such as coffee primer.

The composition according to an embodiment of the present disclosure may be a solid phase (solid), a liquid phase, or a mixed phase thereof, and more specifically, it may be provided in a liquid, a semi-liquid, a powder or a frozen solid state. The emulsion composition may be a powder or a liquid. The term "powdery emulsion composition" refers to a composition powdered for being adjusted to the intended use of a product, and the term "liquid emulsion composition" is a liquid product prepared for being adjusted to the intended use of a product.

The present disclosure can realize saccharide reduction, low calorie and soft body taste, etc. by substituting allulose for part or the whole of saccharide such as starch syrup and sugar with allulose.

Unless otherwise stated, the term "saccharide reduction" as used herein means that the contents of monosaccharides such as glucose, fructose, sucrose, etc. and disaccharides, which are known to increase the risk of occurrence of obesity, diabetes, cardiovascular diseases, other various adult diseases in their excessive intake, are reduced, and the term, "saccharide" does not include rare saccharides such as allulose and the like.

In the present disclosure, the emulsion composition may be a sauce, a food additive, a beverage or a beverage additive.

An embodiment of the present disclosure provides a powdery emulsion composition comprising a vegetable oil, a saccharide and an emulsifier, wherein the saccharide include allulose. For example, it may be a powdery creamer composition comprising allulose, which has emulsion stability and achieves saccharide reduction and low calories. A further embodiment of the present disclosure provides a method for preparing a powdery creamer composition comprising preparing a liquid emulsion sample comprising a vegetable oil, allulose, a starch syrup and an emulsifier, and spray-drying the liquid sample to prepare a powder.

The present disclosure relates to a powdery creamer composition which comprises saccharide, specifically allulose and low DE starch syrup, and has excellent powdering properties and improved emulsion stability and storage stability, and a food using the same.

The powdery creamer composition according to an embodiment of the present disclosure can compensate for problems that may occur during packaging, distribution, and long-term storage of powdery products. Additionally, it is possible to provide a powdery creamer composition comprising allulose with improved sweetness quality, by complementing the problem that sweetness rise of allulose is delayed and a bitter taste (off-taste) is felt in an aftertaste.

An embodiment of the present disclosure relates to a liquid creamer composition containing allulose with reduced saccharide content of sugar, fructose, glucose, maltose and lactose by using allulose, a soft body taste and increased solubility in water, and a method for preparing the same. The liquid emulsion composition according to an embodiment of the present disclosure includes allulose, and thus, can achieve the same level of viscosity as the conventional starch syrup while reducing saccharide compared to the conventional starch syrup. The emulsion composition can be provided by substituting starch syrup partially or entirely with allulose.

The present disclosure relates to an emulsion composition, particularly to an emulsified sauce composition, and more particularly, to an oil-in-water emulsified source composition comprising an edible oil, allulose, an egg yolk and a saccharide. The emulsified sauce composition of the present disclosure has a low cholesterol content by lowering the content of egg yolk, and achieves a fast emulsification rate and secures emulsion stability while achieving saccharide reduction. For example, the present disclosure relates to an emulsified source composition having emulsion stability and viscosity range by substituting allulose for part or the whole of sugars, and a method for preparing the same.

Hereinafter, the present disclosure will be described in more detail.

The present disclosure provides an emulsion composition comprising allulose, and allulose applicable to the emulsion composition of the present disclosure can be added in the form of a syrup or a powder, and as the allulose can be used as a spray-dried powder, a crystalline powder, or the like. When using the allulose powder, the allulose powder solid content may be allulose composition powder, such as a powder containing allulose with a purity of 90% or 95% or more. In a preferred embodiment of the present disclosure, when a liquid emulsion composition is prepared by mixing an oil phase and an water phase components and then powdered in order to prepare a powdery emulsion composition, allulose can be used for preparing a liquid emulsion composition by adding a syrup or a powder. At this time, when allulose powder is used, a liquid emulsion composition can be prepared by adding it dissolved in a separate solvent, for example, water or directly adding it in powder.

The allulose syrup can be the allulose alone or mixed saccharides obtained through separation, purification and concentration processes The viscosity of the allulose syrup may be 2 cps to 200 cps at a temperature of 45° C., and the electrical conductivity may be 1000 uS/cm or less, for example 0.01 to 1000 uS/cm, preferably 30 uS/cm or less, for example 0.1 to 30 uS/cm. In an embodiment of the present disclosure, the allulose syrup obtained by the separation and purification processes may have an electrical conductivity of 1 to 50 μS/cm and may be a liquid allulose syrup having sweetness and a colorless or pale yellow color. The liquid allulose may have a pH range of 4 to 6, and thus produces emulsification under acidic conditions, when it is added to the emulsion composition. The allulose may be a syrup or powder of allulose alone or mixture with other ingredients.

The allulose may be used alone, or may be a mixed saccharides containing additional other saccharides. Examples of the mixed saccharides may contain 1 to 99.9 wt % of allulose based on 100 wt % of the solid content of the total mixed saccharides, and additionally include one or more selected from the group consisting of fructose, glucose, and oligosaccharide. Specific examples of the allulose-containing mixed saccharides may include 2 to 55 wt % of allulose, 30 to 80 wt % of fructose and 2 to 60 wt % of glucose, and 0 to 15 wt % of oligosaccharide based on 100 wt % of the total solid content of the mixed saccharides, and oligosaccharide may not be contained The allulose, fructose and glucose are preferably all D-type isomers.

The allulose syrup can be obtained through separation, purification and concentration processes from the mixed saccharides. In one embodiment of the present disclosure, the allulose syrup obtained by the separation and purification processes is in a liquid phase having a colorless or pale yellow and sweetness and may contain allulose in an amount of 5 wt % or more, 10 wt % or more, 15 wt % or more, 20 wt % or more, 25 wt % or more, 30 wt % or more, 50 wt % or more, 55 wt % or more, 60 wt % or more, 65 wt % or more, 70 wt % or more, 75 wt % or more, 80 wt % or more, 85 wt % or more, 90 wt % or more, 93 wt % or more, 95 wt % or more, 97 wt % or more or more, or 99 wt % or more, for example 10 to 20 wt %, 70 to 99 wt %, or 85 to 95 wt %. based on 100 wt % of the total solid content The allulose syrup may be the allulose alone or mixed saccharides obtained through separation, purification and concentration processes. In one embodiment of the present disclosure, the allulose syrup undergone the separation and purification processes may be an allulose syrup having an electrical conductivity of 1 to 100 μS/cm, 1 to 90 μS/cm, 1 to 80 μS/cm, 1 to 70 μS/cm, or 1 to 60 μS/cm, a colorless or pale yellow color, and sweetness.

The allulose can be prepared by performing chemical synthesis, or a biological method using allulose epimerase. Preferably, the allulose can be prepared by a biological method, for example, by a microorganism or enzyme reaction. For example, the mixed saccharide may be mixed saccharide prepared by reacting a composition for producing allulose comprising one or more kinds selected from the group consisting of allulose epimerase, a microbial cell of a strain producing the epimerase, a culture of the strain, a lysate of the strain, and an extract of the lysate or culture with a fructose-containing raw material, or obtained therefrom.

The liquid emulsion composition of the present disclosure may further include at least one saccharides selected from the group consisting of monosaccharide, disaccharide, sugar alcohol, dietary fiber and oligosaccharide other than allulose. Alternatively, the composition may further include one or more selected from the starch decomposed product, for example, dextrin, maltodextrin, isomaltodextrin, and the like. For example, it may further include one or more saccharides selected from the group consisting of sugar, glucose, fructose (or crystalline fructose), tagatose, xylose, rice starch syrup, honey, corn starch syrup, isomaltooligosaccharide and fructooligosaccharide.

In one embodiment of the present disclosure, in order to adjust the sweetness degree of the emulsion composition, a high-intensity sweetener may include at least one sweetening material selected from the group consisting of steviol glycoside, enzymatically modified stevia, aspartame, stevioside aspartame, acesulfame K, sodium cyclamate, sodium saccharin, sucralose, dulcin, thaumatin, neotame and monellin.

In one embodiment of the present disclosure, there is provided a powdery emulsion composition comprising a saccharide, an edible oil and an emulsifier. The low DE starch syrup contained in the powdery emulsion composition may be starch syrup that has a DE of 20-25 and has a solid content of saccharide, for example, a glucose at 5 to 10 wt % or 5 to 7 wt %. In a further embodiment of the present disclosure, there is provided a food, food additive, beverage or beverage additive comprising the powdery emulsion composition.

In a specific embodiment of the emulsion composition according to the present disclosure, a powdery emulsion composition comprising an edible oil, a saccharide and an emulsifier, and optionally further comprising an emulsion stabilizer. The saccharide may include allulose and a low DE starch syrup.

The emulsion composition according to the present disclosure is prepared in the form of a powder, and for example, the powder may include particles or granules having an average particle diameter in the range of 100 μm to 300 μm. In the powdery emulsion composition, the hygroscopic degree is important due to the influence of humidity conditions, especially during production and storage, improves the emulsion stability of products containing allulose and the quality and storage stability of the emulsion composition, and provides a soft body taste.

By using a mixture of starch syrup and allulose, the composition for emulsification according to the present disclosure can provide a powdery emulsion composition that improves sensuality characteristics such as the sweetness degree, sweetness quality, preference and the like, and that has high emulsion stability, low calorie with reduced saccharides, and excellent dissolution rate, resulting being usefully used in drinkable food compositions by dissolving it in a liquid phase. Additionally, by complementing the sensory problem that sweetness rise of allulose is delayed and a bitter taste (off-taste) is felt in an aftertaste, an allulose-containing powdery creamer composition with improved sweetness quality can be provided.

The powdered creamer composition according to the present disclosure can be prepared through a powdering process of a liquid creamer composition including an oil and a saccharide. Various powdering methods for example, a spray drying method can be used for powdering the liquid emulsion composition. Preferably, the powdery creamer composition according to the present disclosure can be prepared as a powder by preparing a liquid emulsion sample and performing powdering process, and may be prepared by pulverizing ingredients other than allulose of the creamer composition and mixing with allulose powder. When a liquid emulsion sample containing allulose is prepared as a powder through a pulverization process, it can be more preferable due to the masking of a bitter aftertaste (off-taste) derived from other raw materials The powdering process may be carried out by a method such as spray drying or vacuum drying, and amorphous powder particles may be formed by evaporating water under temperature and pressure conditions at which water can evaporate, namely high temperature and vacuum (or reduced pressure) conditions. Preferably, the powdery sweetener composition according to the present disclosure may be a spray-dried product prepared by spray-drying a liquid sample containing allulose and a powdering aid agent. In the present disclosure, the spray drying is a drying method in which a liquid sample is sprayed to and dispersed in hot air, and while being conveyed by hot air, water is rapidly evaporated and dried to obtain powder.

Generally, materials used as liquid samples, which are spray-dried raw materials, have a unique glass transition temperature (Tg) value of the material itself, and change to a glass transition state, that is, a sticky and elastic softened state under the condition of higher than Tg value. Therefore, if drying is performed at a temperature equal to or higher than the Tg value, the powder has sticky properties, thereby making it difficult to recover it as a dry powder. Thus, particularly, in the spray drying process, the spray drying must be performed at a temperature below the Tg value, and it is important to adjust the process parameters by setting the outlet temperature at lower than Tg value so as to evaporate water.

Allulose has a sub-zero glass transition temperature (−5.5° C.), which is very low in the Tg value compared to other saccharides. In the allulose powerizing by the spray drying process, when allulose is dried by setting internal temperature or outlet temperature of the powdering device to a temperature below the Tg value, it is difficult to evaporate water at a temperature equal to or lower than the Tg value, so as that drying cannot be performed well. Therefore, it is very difficult for allulose or an allulose-containing composition to form powder particles through a powdering process.

Unless otherwise stated herein, the liquid emulsion composition for powder production is based on the composition before adding water to adjust the solid content for drying.

The present disclosure provides a method for preparing amorphous particles having improved sweetness degree by mixing allulose with starch syrup as a powdering aid agent to increase the Tg value, and spray-drying the mixed solution.

The starch syrup may be a low DE starch syrup having a DE value of 30 or less, or 25 or less, for example, DE 20 to 25 or DE 20 to 24. The low DE starch syrup is a starch syrup having DE20-25, a glucose solid content of 5-7 wt %, and low sweetness. As the low DE starch syrup, a starch syrup having a viscosity of 2,900 to 5,200 cps as measured at a temperature of 30° C. for a 72 Brix syrup solution can be used.

Specifically, when it is applied to a powdery emulsion having a pH of 4.0 to 6.0, such as a coffee creamer, it is often used because it acts as a spray-drying excipient and sweetening agent, and is highly hygroscopic as compared to dextrin. When it is used in combination with allulose, it can improve the properties of allulose which is not spray-dried as allulose alone.

Further, the content of allulose and low DE starch syrup contained in the powdery emulsion composition according to the present disclosure includes preferably more than a specific content of allulose in consideration of the low calorie and emulsion stability. By considering that it is difficult to contain an excessively large amount of allulose due to the powdering characteristics, it is preferable to select an appropriate content range.

The saccharides contained in the powdery emulsion composition according to the present disclosure includes a low DE starch syrup and allulose. Based on 100 wt % of the total solid content of low DE starch syrup and allulose, the allulose solid content may be 45 wt % or less, 40 wt % or less, 35 wt % or less, 30 wt % or less, 27 wt % or less, or 25 wt % or less, or may be or 1 wt % or more, 1.5 wt % or more, 2 wt % or more, 3 wt % or more, 3.5 wt % or more, 4 wt % or more, 4.5 wt % or more, 5 wt % or more, or 7 wt % or more. Specifically, the allulose solid content can be set in an appropriate numerical range by combining the upper limit and the lower limit. Such saccharide composition can make it to powderize the liquid emulsion composition including allulose-containing saccharides and oil. For example, based on 100 wt % of the total solid content of low DE starch syrup and allulose, allulose may be contained in an amount of 1 wt % or more to 50 wt % or less, 1 to 45 wt %, 1 to 40 wt %, 1 to 35 wt %, 1 to 30 wt %, 1 to 27 wt %, 1 to 25 wt %, 1 to 20 wt %, 1 to 16 wt %, 3 to 50 wt %, 3 to 45 wt %, 3 to 40 wt %, 3 to 35 wt %, 3 to 30 wt %, 3 to 27 wt %, 3 to 25 wt %, 3 to 20 wt %, 3 to 16 wt %, 5 to 50 wt %, 5 to 45 wt %, 5 to 40 wt %, 5 to 35 wt %, 5 to 30 wt %, 5 to 27 wt %, 5 to 25 wt %, 5 to 20 wt %, 5 to 16 wt %, 7 to 50 wt %, 7 to 45 wt %, 7 to 40 wt %, 7 to 35 wt %, 7 to 30 wt %, 7 to 27 wt %, or 7 to 25 wt %, 7 to 20 wt %, 7 to 16 wt %, 8 to 50 wt %, 8 to 45 wt %, 8 to 40 wt %, 8 to 35 wt %, 8 to 30 wt %, 8 to 27 wt %, 8 to 25 wt %, 8 to 20 wt %, 8 to 16 wt %, 10 to 50 wt %, 10 to 45 wt %, 10 to 40 wt %, 10 to 35 wt %, 10 to 30 wt %, 10 to 27 wt %, 10 to 25 wt %, 10 to 20 wt %, 10 to 16 wt %, 15 to 50 wt %, 15 to 40 wt %, 15 to 35 wt %, 15 to 30 wt %, 15 to 27 wt %, 15 to 25 wt %, 15 to 20 wt %. Based on 100 wt % of the total solid content of low DE starch syrup and allulose, the low DE starch syrup may be contained in an amount of 50 to 99 wt %, 55 to 99 wt %, 60 to 99 wt %, 65 to 99 wt %, 70 to 99 wt %, 75 to 99 wt %, 80 to 99 wt %, 50 to 97 wt %, 55 to 97 wt %, 60 to 97 wt %, 65 to 97 wt %, 70 to 97 wt %, 75 to 97 wt %, 80 to 99 wt %, 50 to 95 wt %, 55 to 95 wt %, 60 to 95 wt %, 65 to 95 wt %, 70 to 95 wt %, 75 to 95 wt %, 80 to 95 wt %, 50 to 93 wt %, 55 to 93 wt %, 60 to 93 wt %, 65 to 93 wt %, 70 to 93 wt %, or 75 to 93 wt %, or 80 to 93 wt %. For example, it may include the residual amount of the allulose content.

The emulsion composition according to the present disclosure can replace part or the whole of the exising high-calorie saccharides such as starch syrup, by using allulose alone or mixing it with other saccharides, and thus may be a low calorie emulsion composition. The liquid sample for preparing the powdery emulsion composition according to the present disclosure has an upper limit value of calories per 100 mL may be 470 kcal or less, 465 kcal or less, 460 kcal or less or 455 kcal or less, or a lower limit value of 50 kcal or more, 100 kcal or more or 150 kcal or more, or may be a combined range of the upper limit value and the lower limit value.

In one embodiment of the present disclosure, the emulsion composition may further include at least one selected from the group consisting of high-intensity sweeteners and sugars in the liquid sample. The content of the added sweetening material may be an appropriate amount in consideration of the sweetness degree of each material compared to sugar, and for example, it may be an amount of 0.00001 to 5 wt % based on 100 wt % of the emulsion composition.

The powdery emulsion composition according to the present disclosure may contain saccharides including allulose and starch syrup in an amount of 35 to 70 wt %, 37 to 70 wt %, 40 to 70 wt %, 41 to 70 wt %, 42 to 70 wt %, 43 to 70 wt %, 44 to 70 wt %, 35 to 65 wt %, 37 to 65 wt %, 40 to 65 wt %, 41 to 65 wt %, 42 to 65 wt %, 43 to 65 wt %, 44 to 65 wt %, 35 to 65 wt %, 35 to 65 wt %, 35 to 60 wt %, 37 to 60 wt %, 40 to 60 wt %, 41 to 60 wt %, 42 to 60 wt %, 43 to 60 wt %, 44 to 60 wt %, 35 to 55 wt %, 37 to 55 wt %, 40 to 55 wt %, 41 to 55 wt %, 42 to 55 wt %, 43 to 55 wt %, 44 to 55 wt %, 35 to 50 wt %, 37 to 50 wt %, 40 to 50 wt %, 41 to 50 wt %, 42 to 50 wt %, 43 to 50 wt %, or 44 to 50 wt %, based on 100 wt % of the liquid sample for preparing powder.

In the powdery emulsion composition according to the present disclosure, the solid content of the saccharides including allulose and starch syrup may be 35 to 70 wt %, 37 to 70 wt %, 40 to 70 wt %, 41 to 70 wt %, 42 to 70 wt %, 43 to 70 wt %, 44 to 70 wt %, 47 to 70 wt %, 50 to 70 wt %, 35 to 65 wt %, 37 to 65 wt %, 40 to 65 wt %, 41 to 65 wt %, 42 to 65 wt %, 43 to 65 wt %, 44 to 65 wt %, 47 to 65 wt %, 50 to 65 wt %, 35 to 65 wt %, 35 to 60 wt %, 37 to 60 wt %, 40 to 60 wt %, 41 to 60 wt %, 42 to 60 wt %, 43 to 60 wt %, 44 to 60 wt %, 47 to 60 wt %, or 50 to 60 wt %, based on 100 wt % of the powdery emulsion composition.

The powdery emulsion composition according to the present disclosure may contain a vegetable oil in an amount of 25 to 45 wt %, 26 to 45 wt %, 27 to 45 wt %, 28 to 45 wt %, 29 to 45 wt %, 29.5 to 45 wt %, 30 to 45 wt %, 33 to 45 wt %, 35 to 45 wt %, 36 to 45 wt %, 37 to 45 wt %, 25 to 40 wt %, 26 to 40 wt %, 27 to 40 wt %, 28 to 40 wt %, 29 to 40 wt %, 29.5 to 40 wt %, 30 to 40 wt %, 33 to 40 wt %, or 35 to 40 wt %, 36 to 40 wt %, or 37 to 40 wt %, based on 100 wt % of the powdery emulsion composition.

The powdery emulsion composition according to the present disclosure may contain a vegetable oil in an amount of 25 to 45 wt %, 26 to 45 wt %, 27 to 45 wt %, 28 to 45 wt %, 29 to 45 wt %, 29.5 to 45 wt %, 25 to 40 wt %, 26 to 40 wt %, 27 to 40 wt %, 28 to 40 wt %, 29 to 40 wt %, 29.5 to 40 wt %, 25 to 37 wt %, 26 to 37 wt %, 27 to 37 wt %, 28 to 37 wt %, 29 to 37 wt %, 29.5 to 37 wt %, 25 to 35 wt %, 26 to 35 wt %, 27 to 35 wt %, 28 to 35 wt %, 29 to 35 wt %, 29.5 to 35 wt %, 25 to 33 wt %, 26 to 33 wt %, 27 to 33 wt %, 28 to 33 wt %, 29 to 33 wt %, or 29.5 to 33 wt %, based on 100 wt % of the liquid sample for powder preparation.

In one embodiment of the present disclosure, the composition may include 35 to 70 wt % of saccharides including allulose and starch syrup, 25 to 45 wt % of a vegetable oil, and 0.01 to 10 wt % of an emulsifier, based on 100 wt % of the liquid sample for powder preparation.

The powdery emulsion composition according to the present disclosure may further include an anti-caking agent, and for example, the anti-caking agent may be at least one selected from the group consisting of nondigestible maltodextrin (NMD), polydextrose, dextrin, and maltooligosaccharide. The emulsion composition according to the present disclosure may further include a phosphate as a quality improver. For example, it includes potassium polyphosphate, potassium triphosphate, etc., and performs an emulsifying action, a dispersing action, and an anti-caking function.

The emulsifier may be contained in an amount of 0.01 to 10 wt %, 0.01 to 6.0 wt %, 0.01 to 4.0 wt %, 0.01 to 2.0 wt %, 0.01 to 1.0 wt %, 0.01 to 0.5 wt %, 0.05 to 10 wt %, 0.05 to 6.0 wt %, 0.05 to 4.0 wt %, 0.05 to 2.0 wt %, 0.05 to 1.0 wt %, 0.05 to 0.5 wt %, 0.1 to 10 wt %, 0.1 to 6.0 wt %, 0.1 to 4.0 wt %, 0.1 to 2.0 wt %, 0.1 to 1.0 wt %, 0.1 to 0.5 wt %, 0.2 to 10 wt %, 0.2 to 6.0 wt %, 0.2 to 4.0 wt %, 0.2 to 2.0 wt %, 0.2 to 1.0 wt %, 0.2 to 0.5 wt %, based on 100 wt % of the liquid sample for powder preparation or 100 wt % of the powdery emulsion composition, The edible oil may be a vegetable oil or a processed oil of vegetable oil. The vegetable oil includes palm oil, cottonseed oil, olive oil, rapeseed oil, coconut oil, soybean oil, fractionated coconut oil, sunflower oil, brown rice oil, rice bran oil, olive oil, and the like, and may be one oil, or mixed oils of two or more oils. It may be a processed oil of at least one vegetable oil selected from the group consisting of hydrogenated oil of vegetable oil and a transesterified oil of vegetable oil, but is not particularly limited. The processed oil of the vegetable oil includes processed oil obtained by performing processing such as fractionation, hydrogenation, or transesterification of vegetable oil, or mixed oil thereof. For example, it may contain a hydrogenated oil of a vegetable oil or the like in which chemical treatment, for example, hydrogenation, etc. are performed on the vegetable oil to make a liquid oil or fat into a hydrogenated oil. The hydrogenated oil of vegetable oil according to the present disclosure may be at least one selected from the group consisting of hydrogenated palm kernel oil, hydrogenated palm oil, and hydrogenated coconut oil. In one embodiment, hydrogenated palm oil or palm oil can be used as preferred edible oil.

The emulsifier that can be used in the present disclosure is not particularly limited as long as it is an emulsifier capable of being used in foods. For example, nonionic emulsifiers, cationic emulsifiers, amphoteric emulsifiers, and the like. can be used. Specifically, it may include at least one selected from the group consisting of lecithin, glycerin fatty acid ester (e.g., monoglycerin fatty acid ester, polyglycerol condensed fatty acid ester), and polysorbate-based emulsifier. The fatty acid may be a fatty acid having 12 to 20 carbon atoms.

The phosphate salt can be used as a buffer or acidity regulator, and it can make the flavor softer by neutralizing the acidity of coffee, and due to the low pH, it can prevent a feathering phenomenon which is aggregation of proteins such as casein or sodium caseinate including milk. The phosphate salt includes sodium metaphosphate, potassium diphosphate, pyrophosphate, potassium polyphosphate, sodium hexametaphosphate, and the like. Examples of the citrate salt include trisodium citrate and the like. The phosphate salt is used to alleviate the sour taste of coffee, and prevent milk proteins such as sodium caseinate used as a protein raw material from being denatured or coagulated due to the low pH of coffee, high water temperature, metal ions, etc.

The powdery emulsion composition according to the present disclosure can be prepared by drying an emulsified liquid containing an edible oil, a low DE starch syrup, allulose and an emulsifier according to a drying method such as spray drying, drum drying, or hot air drying, or preferably spray drying.

The powdery emulsion composition may further include at least one selected from the group consisting of an emulsion stabilizer, a dairy product, a flavor and a pigment.

The spray drying should be performed at a temperature lower than the glass transition temperature of the liquid sample. For example, the drying can be performed at a temperature 5° C. lower than Tg of the liquid sample (Tg-5° C.) or less, preferably Tg-3° C. or less. Further, the upper limit of the spray drying temperature may be 100° C. As a specific example, the spray drying temperature according to the present disclosure may be 75 to 100° C., or preferably 85 to 98° C. The spray drying temperature may be the temperature inside the spray dryer or the temperature of the outlet air. The spray drying temperature can be set in a preferable range by adjusting the hot air temperature injected into the spray dryer and the feeding rate of the liquid sample. The hot air temperature injected into the spray dryer can be appropriately adjusted so as to satisfy the temperature condition of spray drying, and for example, it may be in the temperature range of 130 to 170° C. The feeding rate of the liquid sample poured for the spray drying may be 5 to 50 mL/min, or for example, 5 to 10 mL/min.

In the spray drying according to the present disclosure, the liquid sample to be sprayed can be sprayed with various spraying means, for example, a disk or a nozzle, and dried by blowing hot air inside the dryer. Examples of the atomizer of the spray dryer include a two-fluid nozzle, a pressure nozzle, a rotary atomizer and the like.

The solid content of the liquid sample for pulverization in the present disclosure may be 30 to 80 wt %, 30 to 70 wt % (or brix), 45 to 60 wt %, 45 to 58 wt %, 45 to 57 wt %, or 45 to 55 wt %.

An embodiment of the present disclosure relates to a food, food additive, beverage or beverage additive comprising the powdery emulsion composition. The food or food additive includes margarine, coffee creamer, and the like.

The powdery emulsion composition according to the present disclosure may be a coffee creamer, and may optionally contain a dairy product in an amount of 3 to 20 parts by weight, or preferably 3 to 15 parts by weight, based on the solids weight of the total emulsion composition. The type of powdered dairy products may include powdered milk cream (powdered fresh cream), powdered butter, powdered processed butter, skim milk, whole milk powder, sodium caseinate, and the like, or preferably powdered milk cream (powdered fresh cream) or sodium casein. The types of powdered dairy products may include powdered milk cream (powdery fresh cream), powdery butter, powdery processed butter, skim milk, whole milk powder, and the like.

The powdery emulsion composition according to the present disclosure may optionally include a casein salt, and for example, the casein salt may be, the casein salt may be sodium caseinate. Casein is a part of milk proteins, and used for foods such as coffee creamer and processed milk food, ice cream mixes, and toppings. However, in order to use casein in food by rehydrating the precipitated form of casein, it is often used after conversion to a salt in the form of calcium caseinate or sodium caseinate. Casein or its sodium salt has an emulsifying function and an emulsion stabilizing function, and also functions for providing milk flavor to foods.

As the edible oil, emulsifiers and emulsion stabilizers of coffee creamer, all of the above-mentioned emulsifiers and emulsion stabilizers used in the powdery emulsion composition according to the present disclosure can be used, and are the same as those described above.

The coffee creamer according to the present disclosure may further include a dairy product, and the dairy product is as described above. In an embodiment according to the present disclosure, when sodium caseinate is included in the coffee creamer, it may contain 0.1 to 10 wt %, for example 0.5 to 8 wt % of sodium caseinate, based on 100 wt % of the total creamer composition.

The coffee primer according to an embodiment of the present disclosure may further include a compound selected from the group consisting of sodium silicoaluminate, and phosphate salt.

In an embodiment according to the present disclosure, when phosphate is included in the coffee creamer, it may contain 1 to 5 wt % of phosphate based on 100 wt % of the total creamer composition. Sodium caseinate may be a flavoring aid to give a flavor similar to dairy products or milk, and also functions to improve whipping and maintain physical properties as a raw material for protein. Examples of the phosphate include sodium metaphosphate, potassium diphosphate, pyrophosphate, potassium polyphosphate, sodium hexametaphosphate, and the like. The potassium polyphosphate is also described as potassium tripolyphosphate in the Korean Food Additives Code.

The powdery emulsion composition of the present disclosure, for example, powdery coffee creamer composition, can be obtained by drying, for example, spray drying a liquid sample containing an edible oil, a saccharide and an emulsifier. In one embodiment of the present disclosure, the powdery emulsion composition is a spray-dried product, which may be a spray-dried product of a liquid sample including allulose and a powdering aid agent. More specifically, the method for producing a powdery emulsion composition according to the present disclosure may include the step of preparing a liquid sample including an edible oil, a saccharide and an emulsifier, and spray-drying the liquid sample to prepare a powdery emulsion composition.

In the method for preparing the powdery emulsion composition according to the present disclosure, allulose, an edible oil, and an emulsifier are the same as described above.

In another embodiment of the present disclosure, the emulsified food composition according to the present disclosure comprises a vegetable oil, a saccharide and an emulsifier and a liquid emulsion composition, in which the saccharide comprises allulose. The vegetable oil, allulose, emulsifier and saccharide used in the liquid emulsion composition according to the present disclosure can be applied by those described in detail in the above powdery emulsion composition.

The emulsion composition according to an embodiment of the present disclosure can achieve the same level of viscosity as that of the existing starch syrup while reducing saccharides, by including allulose. The emulsion composition can be prepared by substituting the starch syrup partly or wholly.

The liquid emulsion composition according to the present disclosure can replace part or the whole of the existing high-calorie saccharides such as starch syrup, by using allulose alone or mixing allulose with other saccharides, so as to be a low-calorie emulsion composition. The liquid emulsion composition according to the present disclosure may have an upper limit value of calories per 100 mL of 470 kcal or less, 465 kcal or less, 460 kcal or less, 455 kcal or less, 450 kcal or less, 445 kcal or less, 440 kcal or less, 435 kcal or less, 430 kcal or less, 425 kcal or less, or 420 kcal or less, or a lower limit value of calories of 50 kcal or more, 100 kcal or more or 150 kcal or more, or may be a combined range of the upper limit value and the lower limit value.

The dissolution rate of the liquid emulsion composition according to an embodiment of the present disclosure may be more than 1 time to 10 times, more than 1 time to 9 times, more than 1 time to 8 times, more than 1 time to 7 times, more than 1 time to 6 times, more than 1 time to 5 times, more than 1 time to 4 times, more than 1 time to 3 times, more than 1 time to 2 times, more than 1 time to 1.8 times, 1.05 to 10 times, 1.05 to 9 times, 1.05 to 8 times, 1.05 to 7 times, 1.05 to 6 times, 1.05 to 5 times, 1.05 to 4 times, 1.05 to 3 times, 1.05 to 2 times, or 1.05 to 1.8 times, compared to the dissolution rate in water of the emulsion composition containing the same amount of low DE starch syrup having DE 20 to 25 without containing allulose.

The dissolution rate of the liquid emulsion composition according to an embodiment of the present disclosure may be more than 100%, 105% or more, 109% or more, 110% or more, 120% or more, 125% or more, 130% or more, 140% or more, 150% or more, 160% or more, or 170% or more of the dissolution rate in water of the emulsion composition containing the same amount of low DE starch syrup having DE 20 to 25 without containing allulose. The upper limit value of the dissolution rate may be 1,000% or less, 900% or less, 800% or less, 700% or less, 600% or less, 500% or less, 400% or less, 300% or less, 200% or less, 190% or less, or 180% or less.

The dissolution rate refers to the dissolution rate at a temperature of 95° C. or more, for example, 95 to 98° C. for the emulsion composition containing allulose or the emulsion composition (control group) containing low DE starch syrup having DE 20 to 25 without containing allulose. Specifically, 15 g of an emulsion composition containing allulose or an emulsion composition containing a low DE starch syrup having DE 20 to 25 (control group) without containing allulose are respectively dissolved in 100 mL of water at 95° C. or more, for example, 95 to 98° C. 50 g of the dissolved sample is collected and centrifuged at 4,000 rpm for 10 minutes to obtain precipitate, and then the weight (g) of the obtained precipitate is measured, and it may be expressed as a percentage by dividing 50 g of the dissolved sample by the measured weight of the precipitate. That is, as the weight of the precipitate is smaller, the solubility of the emulsion composition is higher.

The saccharides contained in the emulsified food composition according to the present disclosure may include allulose alone or both allulose and starch syrup together. The starch syrup may be ion starch syrup, malt starch syrup, or low DE starch syrup having a relatively low DE value. The starch syrup may be a low DE starch syrup having DE(dextrose equivalent) 30 or less, or DE 25 or less, for example, DE 20 to 25 or DE 20 to 25. The low DE starch syrup is a starch syrup having DE20-25, a glucose solid content of 5 to 10 wt % or 5 to 7 wt %, and low sweetness.

The liquid emulsion composition of the present disclosure may further include at least one saccharide selected from the group consisting of monosaccharide, disaccharide, sugar alcohol, dietary fiber and oligosaccharide other than allulose. Alternatively, the composition may further include at least one selected from the starch decomposed product, for example, dextrin, maltodextrin, isomaltodextrin, and the like. For example, it may further include one or more saccharides selected from the group consisting of sugar, glucose, fructose (or crystalline fructose), tagatose, xylose, grain syrup, honey, starch syrup, isomaltooligosaccharide and fructooligosaccharide.

In one embodiment of the present disclosure, the liquid emulsion composition may include the high-intensity sweetener to adjust the degree of sweetness in an appropriate amount in consideration of the sweetness degree compared to the sugar of each material For example, it may be contained in an amount of 0.00001 to 5 wt % based on 100 wt % of the emulsion composition.

The liquid emulsion composition according to the present disclosure may contain the saccharides in an amount of 35 to 70 wt %, 37 to 70 wt %, 40 to 70 wt %, 41 to 70 wt %, 42 to 70 wt %, 43 to 70 wt %, 44 to 70 wt %, 35 to 65 wt %, 37 to 65 wt %, 40 to 65 wt %, 41 to 65 wt %, 42 to 65 wt %, 43 to 65 wt %, 44 to 65 wt %, 35 to 60 wt %, 37 to 60 wt %, 40 to 60 wt %, 41 to 60 wt %, 42 to 60 wt %, 43 to 60 wt %, 44 to 60 wt %, 35 to 55 wt %, 37 to 55 wt %, 40 to 55 wt %, 41 to 55 wt %, 42 to 55 wt %, 43 to 55 wt %, 44 to 55 wt %, 35 to 50 wt %, 37 to 50 wt %, 40 to 50 wt %, 41 to 50 wt %, 42 to 50 wt %, 43 to 50 wt %, or 44 to 50 wt %, based on 100 wt % of the liquid emulsion composition.

When the saccharide contained in the liquid emulsion composition according to the present disclosure is allulose alone, the saccharide content may be the content of allulose. When the saccharide contains additional secondary saccharide in addition to allulose, it may be the total content of allulose and additional saccharide. For example, the saccharides contained in the liquid emulsion composition according to the present disclosure do not contain starch syrup, or may contain both starch syrup and allulose together.

As the saccharides, allulose and starch syrup can be appropriately mixed within the range of the total saccharide content, but in consideration of saccharide reduction, physical properties and sensory properties change, the mixing weight ratio of allulose and starch syrup the solid content is 0.1 to 99.9 of allulose and 0.1 to 99.9 of starch syrup, based on a total weight 100 of allulose and starch syrup. In consideration of the purpose for reducing saccharide, it is preferable to increase mixing weight ratio of the allulose solid content and reduce starch syrup solid content. For example, the mixing weight ratio of allulose solid content may be 10 to 99.9, 15 to 99.9, 20 to 99.9, 25 to 99.9, 30 to 99.9, 35 to 99.9, 40 to 99.9, 45 to 99.9, 50 to 99.9, 55 to 99.9, 60 to 99.9, 65 to 99.9, 70 to 99.9, 75 to 99.9, 80 to 99.9, or 85 to 99.9, but is not limited thereto.

The emulsion composition according to the present disclosure may contain a vegetable oil in an amount of 23 to 45 wt %, 24 to 45 wt %, 25 to 45 wt %, 26 to 45 wt %, 27 to 45 wt %, 28 to 45 wt %, 29 to 45 wt %, 29.5 to 45 wt %, 23 to 40 wt %, 24 to 40 wt %, 25 to 40 wt %, 26 to 40 wt %, 27 to 40 wt %, 28 to 40 wt %, 29 to 40 wt %, 29.5 to 40 wt %, 23 to 37 wt %, 24 to 37 wt %, 25 to 37 wt %, 26 to 37 wt %, 27 to 37 wt %, 28 to 37 wt %, 29 to 37 wt %, 29.5 to 37 wt %, 23 to 35 wt %, 24 to 35 wt %, 25 to 35 wt %, 26 to 35 wt %, 27 to 35 wt %, 28 to 35 wt %, 29 to 35 wt %, 29.5 to 35 wt %, 23 to 35 wt %, 24 to 35 wt %, 25 to 35 wt %, 26 to 35 wt %, 27 to 35 wt %, 28 to 35 wt %, 29 to 35 wt %, or 29.5 to 35 wt %, based on 100 wt % of the liquid emulsion composition.

The emulsion composition according to the present disclosure may be prepared by adding alluose in the form of syrup or powder, and allulose may be used as a spray-dried powder, crystalline powder, or the like. When using the allulose powder, a liquid emulsion composition may be prepared by adding allulose dissolved in a separate solvent, for example, water or directly adding powder.

The content of allulose may be added in an amount suitable for the sweetness degree and sensory properties of the liquid emulsion composition, or preferably the liquid creamer composition. When the saccharide contained in the liquid emulsion composition is allulose alone, the solid content of allulose may be 35 to 70 wt %, 37 to 70 wt %, 40 to 70 wt %, 41 to 70 wt %, 42 to 70 wt %, 43 to 70 wt %, 44 to 70 wt %, 35 to 65 wt %, 37 to 65 wt %, 40 to 65 wt %, 41 to 65 wt %, 42 to 65 wt %, 43 to 65 wt %, 44 to 65 wt %, 35 to 60 wt %, 37 to 60 wt %, 40 to 60 wt %, 41 to 60 wt %, 42 to 60 wt %, 43 to 60 wt %, 44 to 60 wt %, 35 to 55 wt %, 37 to 55 wt %, 40 to 55 wt %, 41 to 55 wt %, 42 to 55 wt %, 43 to 55 wt %, 44 to 55 wt %, 35 to 50 wt %, 37 to 50 wt %, 40 to 50 wt %, 41 to 50 wt %, 42 to 50 wt %, 43 to 50 wt %, or 44 to 50 wt %, based on 100 wt % of the emulsion composition.

Allulose contained in the emulsion composition of the present disclosure may be in the form of syrup or powder. The allulose syrup may be a solution prepared in various concentrations using allulose. For example, the allulose solid content in the allulose syrup may be 10 to 100 wt % based on 100 wt % of the allulose syrup, and preferably it can be prepared by mixing 70 to 99.99 wt %, more preferably 90 to 99.99 wt %. When using the allulose powder, the allulose powder solid content may be an allulose powder having a purity of 90% or more, for example, 90 to 99.99 wt %, or more preferably 95 to 99.99 wt % of allulose, based on the total composition powder.

The allulose syrup may be an allulose-containing syrup containing 5 wt % or more or 10 wt % or more of allulose in a liquid form. For example, the allulose-containing syrup may contain allulose in an amount of 5 to 99.9 wt %, 5 to 97 wt %, 5 to 95 wt %, 5 to 93 wt %, 5 to 90 wt %, 5 to 85 wt %, 5 to 80 wt %, 5 to 50 wt %, 5 to 30 wt %, 6.5 to 99.9 wt %, 6.5 to 97 wt %, 6.5 to 95 wt %, 6.5 to 93 wt %, 6.5 to 90 wt %, 6.5 to 85 wt %, 6.5 to 80 wt %, 6.5 to 50 wt %, 6.5 to 30 wt %, 9 to 99.9 wt %, 9 to 97 wt %, 9 to 95 wt %, 9 to 93 wt %, 9 to 90 wt %, 9 to 85 wt %, 9 to 80 wt %, 9 to 50 wt %, 9 to 30 wt %, 9 to 25 wt %, 9 to 20 wt %, 50 to 99.9 wt %, 50 to 97 wt %, 50 to 95 wt %, 50 to 93 wt %, 50 to 90 wt %, 50 to 85 wt %, 50 to 80 wt %, 70 to 99.9 wt %, 70 to 97 wt %, 70 to 95 wt %, 70 to 93 wt %, 70 to 90 wt %, 70 to 85 wt %, 70 to 80 wt %, 80 to 99.9 wt %, 80 to 97 wt %, 80 to 95 wt %, 80 to 93 wt %, 80 to 90 wt %, 80 to 85 wt %, 90 to 99.9 wt %, 90 to 97 wt %, 90 to 95 wt %, 90 to 93 wt %, 93 to 99.9 wt %, 93 to 97 wt %, 93 to 95 wt %, 95 to 99.9 wt %, or 95 to 97 wt %.

The liquid allulose may have a pH range of 4 to 6, and thus produces emulsification under acidic conditions, when it is added to the emulsion composition. The allulose may be a syrup or powder of allulose alone or mixture with other ingredients. The allulose may be used alone, or may be a mixed saccharides containing additional other saccharides. Examples of the mixed saccharides may contain 1 to 99.9 wt % of allulose based on 100 wt % of the solid content of the total mixed saccharides, and further include one or more selected from the group consisting of fructose and glucose. When the allulose-containing mixed saccharides include fructose and/or glucose, the mixed saccharides may include 1 to 90 wt % of fructose and/or 1 to 50 wt % of glucose.

Specific examples of the allulose-containing mixed saccharides may include 5 to 95 parts by weight of allulose, 1 to 50 parts by weight of fructose and 1 to 55 parts by weight of glucose, and 1 to 10 parts by weight of oligosaccharide based on 100 parts by weight of the total solid content of the mixed saccharides, and oligosaccharides may not be included. The allulose, fructose and glucose are preferably all D-type isomers.

The emulsion composition according to an embodiment of the present disclosure may include saccharide and an emulsifier. For example, the composition for preparing a coffee creamer may include 25 to 45 wt % of hydrogenated palm oil as an edible oil, 35 to 70 wt % of saccharides, and 0.1 to 10 wt % of an emulsifier, based on 100 wt % of the coffee creamer composition.

The solid content of the liquid emulsion composition according to the present disclosure may be 30 to 80 wt %, 30 to 70 wt % (or brix), 45 to 60 wt %, or 45 to 55 wt %. The solid content can be adjusted by adding purified water to the obtained liquid emulsion. Unless otherwise specified herein, the liquid emulsion composition in the present disclosure relates to a liquid emulsion before adding water for adjusting the solid content.

The edible oil may be a vegetable oil or a processed oil of vegetable oil. The vegetable oil includes palm oil, cottonseed oil, olive oil, rapeseed oil, coconut oil, soybean oil, fractionated coconut oil, sunflower oil, brown rice oil, rice bran oil, olive oil, and the like, and may be mixed oils of two or more oils. It may be a processed oil of at least one vegetable oil selected from the group consisting of hydrogenated oil of vegetable oil and a transesterified oil of vegetable oil, but is not particularly limited. The processed oil of the vegetable oil includes processed oil obtained by performing processing such as fractionation, hydrogenation, or transesterification of vegetable oil, or mixed oil thereof. For example, it may contain a hydrogenated oil of a vegetable oil or the like in which chemical treatment, for example, hydrogenation, etc. are performed on the vegetable oil to make a liquid oil or fat into a hydrogenated oil. The hydrogenated oil of vegetable oil according to the present disclosure may be at least one selected from the group consisting of hydrogenated palm kernel oil, hydrogenated palm oil, and hydrogenated coconut oil. In one embodiment, hydrogenated palm oil or palm oil can be used as preferred edible oil.

The emulsified food composition according to the present disclosure may include an emulsifier, and the emulsifier that can be used in the present disclosure is not particularly limited as long as it is an emulsifier capable of being used in foods. For example, nonionic emulsifiers, cationic emulsifiers, amphoteric emulsifiers, and the like can be used.

Specifically, it may include at least one selected from the group consisting of lecithin, glycerin fatty acid ester (e.g., monoglycerin fatty acid ester, polyglycerol condensed fatty acid ester), and polysorbate-based emulsifier. The fatty acid may be a fatty acid having 12 to 20 carbon atoms.

The emulsion stabilizer may be at least one selected from the group consisting of cellulose gum, carboxymethylcellulose, gum arabic, gum tragacanth, karaya gum, locust bean gum, agar, alginic acid, gellan gum, pectin, sucrose fatty acid ester, glycerin fatty acid ester, glycerin acetic acid-fatty acid ester, glycerin lactic acid-fatty acid ester, glycerin citric acid-fatty acid ester, glycerin succinic acid-fatty acid ester, glycerin acetyl tartaric acid-fatty acid ester, polyglycerin fatty acid ester, sorbitan fatty acid ester, propylene glycol fatty acid ester, polysorbate, lecithin, saponin, carrageenan, guar gum, and sodium caseinate.

In an embodiment according to the present disclosure, when the emulsion composition, for example, a coffee creamer contains sodium caseinate, sodium caseinate may be contained in an amount of 0.1 to 5 wt %, for example 0.5 to 8 wt %, based on 100 wt % of the total creamer composition. Sodium caseinate can act as a flavoring aid to create a flavor similar to a dairy product or a milk. Sodium caseinate can act as a flavoring aid to create a flavor similar to a dairy product or a milk. Further, as a raw material of protein, it perform the function of improving whipping and maintaining physical properties.

The phosphate salt can be used as a buffer or acidity regulator, and it can make the flavor softer by neutralizing the acidity of coffee, and due to the low pH, it can prevent a feathering phenomenon which is aggregation of proteins such as casein or sodium caseinate including milk. The phosphate salt includes sodium metaphosphate, potassium diphosphate, pyrophosphate, potassium polyphosphate, sodium hexametaphosphate, and the like. Examples of the citrate salt include trisodium citrate and the like. The phosphate salt is used to alleviate the sour taste of coffee, and prevent milk proteins such as sodium caseinate used as a protein raw material from being denatured or coagulated due to the low pH of coffee, high water temperature, metal ions, etc.

The emulsion composition according to the present disclosure may optionally include a casein salt, and for example, the casein salt may be, the casein salt may be sodium caseinate. Casein is a part of milk proteins, and used for foods such as coffee creamer and processed milk food, ice cream mixes, and toppings. However, in order to use casein in food by rehydrating the precipitated form of casein, it is often used after conversion to a salt in the form of calcium caseinate or sodium caseinate. Casein or its sodium salt has an emulsifying function and an emulsion stabilizing function, and also functions for providing milk flavor to foods.

An emulsion composition comprising allulose according to a further embodiment of the present disclosure relates to an emulsified source composition. Particularly, the present disclosure relates to an emulsified source composition, and more particularly, it relates to an oil-in-water emulsion source composition comprising an edible oil, allulose, an egg yolk and a saccharide.

As the vegetable oil, allulose, emulsifiers, and sugars used in the emulsified source composition according to the present disclosure, those described in detail in the above powdery emulsion composition can be applied.

The emulsified source composition according to an embodiment of the present disclosure may have a viscosity of 45,000 cp to 250,000 cp as measured at a temperature of 25° C. immediately after preparation.

Further, based on 100 wt % of the total content of the emulsified source composition, the allulose solid content (A) is 0.5 to 15 wt %, and the liquid egg yolk content (B) is 1.4 wt % to 10 wt %, and the ratio (A/B) of the allulose solid content to the liquid egg yolk content may satisfy the condition of 0.3 to 2.5, or 0.35 to 1.5.

The emulsified source composition according to the present disclosure can reduce the content of egg yolk by using allulose, thereby achieving equal levels of emulsion stability and viscosity while reducing cholesterol content. Particularly, the viscosity is rather low, and so it is convenient to use as a single source, but it has the advantage of being used as a raw material for producing various sauces by mixing with other sauces. Further, the pH of mayonnaise is lowered during production due to vinegar, but there is a problem that the emulsion stability is not damaged under such low pH conditions and the physical properties such as oxidation of mayonnaise are impaired. However, the emulsion stability is lowered under acidic pH conditions, and thus is supplemented by using emulsion stabilizers, which is not preferable to use due to the synthetic compounds. Therefore, by using allulose in the emulsion source composition according to the present disclosure, the essential emulsion stabilizer is not used or their content can be reduced to solve the problem that the emulsion stability is lowered under acidic pH conditions.

Mayonnaise is a semi-solid emulsion usually produced by adding edible oil to egg yolk and adding vinegar, salt, sugar and other seasonings as auxiliary materials, and is an oil-in-water emulsion in which fine oil particles are emulsified and exist in the water phase. Mayonnaise undergoes physicochemical changes during storage, and typical chemical changes include oxidation of oils, and physical changes include viscosity changes and oil-water separation phenomena.

Unless otherwise stated, the term "saccharide reduction" as used herein means that the contents of monosaccharides such as glucose, fructose, sucrose, etc. and disaccharides, which are known to increase the risk of occurrence of obesity, diabetes, cardiovascular diseases, other various adult diseases in their excessive intake, are reduced, and the term, "saccharide" does not include rare saccharides such as allulose and the like.

Conventionally, when sugar is used alone, the viscosity can be appropriately adjusted, but it is not appropriate from the viewpoint of the time required for emulsification and the amount of oil separation. When allulose is used, it is advantageous because the viscosity is slightly lower than that of sugar, the emulsification proceeds quickly, and the time required for emulsification can be shortened. Further, the degree of oil separation of the emulsified source composition is smaller than that of sugar, and the emulsion stability is improved.

Since the emulsified sauce composition according to the present disclosure uses vinegar, it is an acidic condition. For example, the pH condition measured immediately after the preparation of the emulsified source composition may be pH 4.0 to 6.5, pH 4.0 to 6.3 pH, pH 4.0 to 6.0, pH 4.0 to 5.7, pH 4.0 to 5.5, pH 4.5 to 6.5, pH 4.5 to 6.3 pH, pH 4.5 to 6.0, pH 4.5 to 5.7, or pH 4.5 to 5.5.

The viscosity of the emulsified source composition according to the present disclosure measured at 25° C. immediately after preparation may be 45,000 cp to 300,000 cp, 45,000 cp to 290,000 cp, 45,000 cp to 280,000 cp, 45,000 cp to 270,000 cp, 45,000 cp to 260,000 cp, 45,000 cp to 250,000 cp, 45,000 cp to 240,000 cp, 45,000 cp to 230,000 cp, 50,000 cp to 300,000 cp, 50,000 cp to 290,000 cp, 50,000 cp to 280,000 cp, 50,000 cp to 270,000 cp, 50,000 cp to 260,000 cp, 50,000 cp to 250,000 cp, 50,000 cp to 240,000 cp, 50,000 cp to 230,000 cp, 70,000 cp to 300,000 cp, 70,000 cp to 290,000 cp, 70,000 cp to 280,000 cp, 70,000 cp to 270,000 cp, 70,000 cp to 260,000 cp, 70,000 cp to 250,000 cp, 70,000 cp to 240,000 cp, 70,000 cp to 230,000 cp, 90,000 cp to 300,000 cp, 90,000 cp to 290,000 cp, 90,000 cp to 280,000 cp, 90,000 cp to 270,000 cp, 90,000 cp to 260,000 cp, 90,000 cp to 250,000 cp, 90,000 cp to 240,000 cp, or 90,000 cp to 230,000 cp. The viscosity unit may be expressed as cp (centipoise) or cps, which has the same meaning.

The emulsified source composition according to the present disclosure may have an effective required time of 95% or less, 90% or less, 85% or less, 80% or less, 77% or less, or 76% or less, based on the time when the emulsification time (minutes) of the emulsified source composition having the egg yolk content of 13.6% without containing allulose is 100%. When allulose is used in the preparation of the emulsified sauce composition according to the present disclosure, it is confirmed that the emulsification proceeds more rapidly than sugar and the time required for the emulsification is shortened. The time required for emulsification of such an emulsion composition will act as a factor influencing the production yield and the time required for process when the product is produced on an industrial scale.

In the emulsified sauce composition according to the present invention, the weight of the edible oil separated after 48 hours by alternating −20° C. and 25° C. temperature conditions at 12 hour intervals may be less than 1% by weight, based on 100% by weight of the emulsified source composition.

The emulsified sauce composition according to the present disclosure relates to an oil-in-water emulsified sauce composition comprising an edible oil, vinegar, allulose, egg yolk and water, and contains a certain amount of allulose and egg yolk with the ratio (A/B) of the allulose solid content (A) to the liquid egg yolk (B) content satisfying the condition of 0.3 to 2.5, or 0.35 to 1.5. Allulose and egg yolk liquid contained in the emulsified sauce composition according to the present disclosure have the ratio (A/B) of the allulose solid content (A) to the liquid egg yolk (B) content that satisfies the condition of 0.3 to 2.5, or 0.35 to 1.5, and the solid content of allulose is 0.5 to 15 wt % and the content of liquid egg yolk is 1.4% to 10 wt %, based on the total content of 100 wt % of the emulsified source composition.

In another embodiment of the present disclosure, the total content of allulose and liquid egg yolk contained in the emulsified sauce composition may be 4 to 25 wt %, 4 to 20 wt %, 4 to 15 wt %, 4 to 13 wt %, 5 to 25 wt %, 5 to 20 wt %, 5 to 15 wt %, 5 to 13 wt %, 6 to 25 wt %, 6 to 20 wt %, 6 to 15 wt %, 6 to 13 wt %, 7 to 25 wt %, 7 to 20 wt %, 7 to 15 wt %, 7 to 13 wt %, 8 to 25 wt %, 8 to 20 wt %, 8 to 15 wt %, 8 to 13 wt %, 9 to 25 wt %, 9 to 20 wt %, 9 to 15 wt %, or 9 to 13 wt %, based on 100 wt % of the total content of the emulsified source composition. The egg yolk content contained in the total content of allulose and liquid egg yolk may be 1.4 wt % or more and the allulose content may be 0.5 wt % or more, 1.5 wt % or more, 2.0 wt % or more, 2.5 wt % or more, 3.0 wt % or more, or 3.5 wt % or more, based on 100 wt % of the total content of the emulsified source composition. The increase in the allulose content can supplement the decrease in the egg yolk content contained in the total content of allulose and liquid egg yolk, thereby achieving emulsion stability and reduced emulsification time.

The emulsified sauce composition according to the present disclosure includes egg yolk, and the egg yolk may be added in the form of a liquid, a powder or a whole egg. The yolk of the present disclosure is the yolk of chicken egg. The content of egg yolk can be appropriately selected according to the taste of the consumer, but the content of egg yolk liquid satisfies the condition of Equation 1, and may be 1.4 wt % to 15 wt %, 1.4 to 12 wt %, 1.4 to 10 wt %, 1.4 to 9.5 wt %, 1.4 to 8.5 wt %, 1.4 to 7 wt %, 1.4 to 6.5 wt %, 1.4 to 6.0 wt %, 1.4 to 5.5 wt %, 1.4 to 5.0 wt %, 1.4 to 4.5 wt %, 2.5 wt % to 15 wt %, 2.5 to 12 wt %, 2.5 to 10 wt %, 2.5 to 9.5 wt %, 2.5 to 8.5 wt %, 2.5 to 7 wt %, 2.5 to 6.5 wt %, 2.5 to 6.0 wt %, 2.5 to 5.5 wt %, 2.5 to 5.0 wt %, 2.5 to 4.5 wt %, 3.0 wt % to 15 wt %, 3.0 to 12 wt %, 3.0 to 10 wt %, 3.0 to 9.5 wt %, 3.0 to 8.5 wt %, 3.0 to 7 wt %, 3.0 to 6.5 wt %, 3.0 to 6.0 wt %, 3.0 to 5.5 wt %, 3.0 to 5.0 wt %, or 3.0 to 4.5 wt %, based on 100 wt % of the total content of the emulsified source composition. The content of the egg yolk may be selected in consideration of emulsion stability, taste, cholesterol, and the like. In a preferred embodiment of the present disclosure, it is desirable to reduce the content of egg yolk. The decrease in emulsion stability caused by the decreased content of egg yolk is to be solved by the addition of allulose and the setting of an appropriate content.

Allulose contained in the emulsified source composition according to the present disclosure satisfies the requirement of Equation 1, and at the same time, the solid content of allulose may be 0.5 to 15 wt %, 1.0 to 15 wt %, dk1.5 to 15 wt %, 2.0 to 15 wt %, 2.5 to 15 wt %, 3.0 to 15 wt %, or 3.2 to 15 wt %, based on 100 wt % of the total content of the emulsified source composition. Such an allulose content may be selected in an appropriate range by considering consumer use convenience caused by flowability and viscosity of the source composition, time required for emulsification, emulsion stability, and the like.

Allulose contained in the emulsified sauce composition of the present disclosure may be in the form of syrup or powder. The allulose syrup may be a solution prepared in various concentrations using allulose. For example, allulose in the allulose syrup may be included in an amount of 10 to 100 wt % based on 100 wt % of the allulose syrup.

The allulose syrup may be an allulose-containing syrup containing 5 wt % or more or 10 wt % or more of allulose in a liquid form. For example, the allulose-containing syrup may contain allulose in an amount of 5 to 99.9 wt %, 5 to 97 wt %, 5 to 95 wt %, 5 to 93 wt %, 5 to 90 wt %, 5 to 85 wt %, 5 to 80 wt %, 5 to 50 wt %, 5 to 30 wt %, 6.5 to 99.9 wt %, 6.5 to 97 wt %, 6.5 to 95 wt %, 6.5 to 93 wt %, 6.5 to 90 wt %, 6.5 to 85 wt %, 6.5 to 80 wt %, 6.5 to 50 wt %, 6.5 to 30 wt %, 9 to 99.9 wt %, 9 to 97 wt %, 9 to 95 wt %, 9 to 93 wt %, 9 to 90 wt %, 9 to 85 wt %, 9 to 80 wt %, 9 to 50 wt %, 9 to 30 wt %, 9 to 25 wt %, 9 to 20 wt %, 50 to 99.9 wt %, 50 to 97 wt %, 50 to 95 wt %, 50 to 93 wt %, 50 to 90 wt %, 50 to 85 wt %, 50 to 80 wt %, 70 to 99.9 wt %, 70 to 97 wt %, 70 to 95 wt %, 70 to 93 wt %, 70 to 90 wt %, 70 to 85 wt %, 70 to 80 wt %, 80 to 99.9 wt %, 80 to 97 wt %, 80 to 95 wt %, 80 to 93 wt %, 80 to 90 wt %, 80 to 85 wt %,90 to 99.9 wt %, 90 to 97 wt %, 90 to 95 wt %, 90 to 93 wt %, 93 to 99.9 wt %, 93 to 97 wt %, 93 to 95 wt %, 95 to 99.9 wt %, or 95 to 97 wt %. When using the allulose powder, the allulose powder solid content may be an allulose powder having a purity of 90% or more, for example, 90 to 99.99 wt %, or more preferably 95 to 99.99 wt % of allulose, based on the total composition powder.

The liquid allulose may have a pH in the range of 4 to 6 or 4.0 to 5.5, and thus produces emulsion composition under acidic conditions, when it is added to the emulsion composition. The allulose may be a syrup or powder of allulose alone or mixture with other ingredients. The allulose may be used alone, or may be a mixed saccharides containing additional other saccharides. Examples of the mixed saccharides may contain 1 to 99.9 wt % of allulose based on 100 wt % of the solid content of the total mixed saccharides, and further include one or more selected from the group consisting of fructose and glucose. When the allulose-containing mixed saccharides include fructose and/or glucose, the mixed saccharides may include 1 to 90 wt % of fructose and/or 1 to 50 wt % of glucose.

Specific examples of the allulose-containing mixed saccharides may include 5 to 95 parts by weight of allulose, 1 to 50 parts by weight of fructose and 1 to 55 parts by weight of glucose, and 1 to 10 parts by weight of oligosaccharide based on 100 parts by weight of the total solid content of the mixed saccharides, and oligosaccharides may not be included. The allulose, fructose and glucose are preferably all D-type isomers.

The vegetable oil contained in the emulsified source composition, for example mayonnaise according to the present disclosure includes palm oil, cottonseed oil, olive oil, rapeseed oil, coconut oil, soybean oil, fractionated coconut oil, sunflower oil, brown rice oil, rice bran oil, olive oil, and the like, and may be one oil, or mixed oils of two or more oils, but is not limited thereto.

The edible oil may be a processed oil of at least one vegetable oil selected from the group consisting of hydrogenated oil of vegetable oil and a transesterified oil of vegetable oil, but is not particularly limited. The processed oil of the vegetable oil includes processed oil obtained by performing processing such as fractionation, hydrogenation, or transesterification of vegetable oil, or mixed oil thereof. For example, it may contain a hydrogenated oil of a vegetable oil or the like in which chemical treatment, for example hydrogenation, etc. are performed on the vegetable oil to make a liquid oil into a hydrogenated oil. The hydrogenated oil of vegetable oil according to the present disclosure may be at least one selected from the group consisting of hydrogenated palm kernel oil, hydrogenated palm oil, and hydrogenated coconut oil.

The oil can be used substituted with a fat substitute. According to the composition, it can be classified into a protein-based fat substitute, a carbohydrate-based fat substitute, a fat-based fat substitute, and a synthetic fat substitute. Among them, as a carbohydrate-based fat substitute, modified starch prepared by a chemical treatment method is preferred.

The vegetable oil of the present disclosure is not particularly limited as long as it is a vegetable oil generally used for the production of mayonnaise For example, the vegetable oil of the present disclosure may be soybean oil, corn oil, cottonseed oil, canolan oil, olive oil, and the like.

The emulsified sauce composition according to the present disclosure may have a pH range of 4.5 to 5.5, and may include vinegar. Vinegar constitutes a water phase as a dispersion medium, and its content greatly affects the quality of mayonnaise. Vinegar is not particularly limited in type as long as it is suitable for physical properties and pH conditions of mayonnaise The examples of vinegars include vinegar made from various raw materials such as grain vinegar, fruit vinegar, rice vinegar, rice black vinegar, barley black vinegar, apple vinegar, grape vinegar, and the like according to the raw materials, and include diluted vinegar, fermented vinegar, juices of various fruits such as yuza (citron) juice, lemon juice, etc according to the recipe. Vinegar may be included in an amount of 1 to 10 wt %, or 1 to 8 wt %, based on 100 wt % of the total emulsified sauce composition, and can be appropriately adjusted in consideration of the physical properties and pH conditions of the emulsified source composition.

The emulsified sauce composition according to the present disclosure may include at least one selected from the group consisting of emulsion stabilizers, thickeners, acidity regulators, salts, spices and antioxidants, in addition to vegetable oil, vinegar, egg yolk and allulose.

In the emulsified source composition according to the present disclosure, a predetermined viscosity range can be easily achieved even with the use of a small amount of thickener, and the thickener may be a mixture of pectin and xanthan gum. Thickeners such as pectin tend to have higher solubility and dispersibility as the temperature of the raw emulsified source composition increases. However, when heating saccharide syrup, undesirable changes such as decomposition and color change caused by heating may be accompanied. Thus, in one embodiment of the present disclosure, it is advantageous for the use of a dispersing agent to prevent or reduce the undesirable change of the saccharide syrup caused by heating.

The present disclosure relates to a method for preparing mayonnaise comprising mixing vegetable oil, egg yolk and allulose. At this time, vinegar, salt and sugar are mixed together to prepare mayonnaise. In addition, when vinegar is added before vegetable oil, it can increase the rate of mayonnaise production, and when vinegar is added after vegetable oil, it can increase the viscosity of mayonnaise.

For example, the mayonnaise of the present disclosure can be prepared by the following method. First, sugar, salt, purified water, and egg yolk are provided and mixed. While stirring them continuously, soybean oil is added little by little. When the addition of soybean oil completes, vinegar is added and mixed to prepare the mayonnaise of the present disclosure.

Advantageous Effects

The present disclosure relates to an emulsified food composition which comprises a saccharide and an oil, and achieves good flavor expression and saccharide reduction, and a method for preparing same. The emulsified food composition can be variously applied as food additives, beverage additives, food, and the like.

The powdery emulsion composition according to the present disclosure can provide an emulsified powder composition improving the quality of the product, for example, delay in the fatty rancidity of the powdery emulsion composition, and enhancement in the storage stability of the product by lowing hydrogeneisity. The composition has an excellent dissolution rate and thus, can be usefully used in a food composition that can be dissolved in a liquid phase and drunk.

The liquid emulsion composition containing allulose according to the present disclosure achieves good flavor expression, saccharide reduction, particularly, decreased saccharide content of sugar, fructose, glucose, maltose and lactose, and provides a soft body taste.

BRIEF DESCRIPTION OF THE DRAWINGS

FIG. 1 is a photograph showing the emulsion stability over time of a liquid sample for preparing a powdery emulsion composition according to an example of the present disclosure.

FIG. 2 is a photograph showing the powder in the spray drying process in order to evaluate the suitability of the powdering process of the liquid sample for preparing the powdery emulsion composition according to a comparative example.

FIG. 3 is a photograph of a spray-dried product obtained by spray drying a liquid sample for preparing a powder emulsion composition according to an example and a comparative example of the present disclosure.

FIG. 4 is a photograph of a product obtained in the process of spray-drying a liquid sample for preparing a powdery emulsion composition according to an example and a comparative example of the present disclosure.

FIG. 5 shows a photograph of a liquid coffee prepared by mixing a powdery emulsion obtained by spray-drying a liquid sample for preparing a powdery emulsion composition according to an example and a comparative example of the present disclosure with instant coffee powder.

FIG. 6 shows the results of measuring the solubility of the emulsion composition according to an example of the present disclosure.

DETAILED DESCRIPTION OF THE EMBODIMENTS

The present disclosure will be described in more detail with reference to the following examples, but these examples are not intended to limit the scope of the present disclosure.

Example 1: Preparation of Powder Creamer 1-1: Preparation for Liquid Raw Material of Emulsion Composition Specific components and the content of each component for the preparation of the creamer emulsion composition are shown in Table 1 below. According to the contents shown in Table 1 below, sodium caseinate, dibasic potassium phosphate and potassium polyphosphate were mixed with a low DE starch syrup (DE 20 to 25), and the mixture was stirred at a temperature of 75° C. or more to prepare a water phase part. Hydrogenated palm oil and glycerin fatty acid ester were mixed, and then heated and mixed under conditions of 70° C. or more to prepare an oil phase part. The oil phase part and the water phase part were mixed with a homomixer under condition of 6000 rpm or more for 5 minutes or more for perform a preliminary emulsification. The mixture obtained after the preliminary emulsification was subjected to a second high-pressure emulsification at 180 bar using a homogenizer to obtain a liquid emulsion. In Table 1 below, the content of each component is expressed in wt % based on 100 wt % of the liquid emulsion.

The obtained liquid emulsion was adjusted to 45 to 50 Brix by adding purified water to produce a raw liquid emulsion for spray drying.

The obtained raw liquid emulsion was stored in cylinder and used for emulsion stability experiment. Further, the obtained raw liquid emulsion was used for spray drying.

The low DE starch syrup (DE 20 to 25) available from Samyang Corporation was obtained by mixing 1000 g of corn starch with 2500 g of water, performing a high-temperature liquefaction reaction at 110° C. through a hydroheater, and then passing through a hydroheater at a temperature of 130 to 140° C. to inactivate the liquefying enzyme. Then, the temperature of the product was lowered to 61° C. through a heat exchanger, and then was reacted to DE 20 to 24 using a liquefying enzyme of a-amylase (Liquozyme Supra) used in the liquefaction reaction. Activated carbon was added in an amount of 0.1 to 0.8 wt % based on the solid content, and the mixture was stirred for 30 minutes or more. Then, the activated carbon was removed through a filter press, and then ion purification and concentration were performed to obtain 2000 g of low DE starch syrup. The saccharide composition of the obtained low DE starch syrup is shown by the percentage by weight of solid content in Table 2 below. Table 2 below shows the percentage by weight of solid content of the saccharide compositions of ion starch syrup in Comparative Examples 1 and 2, and low DE starch syrup. In Table 2 below, usually, the content of trisaccharide to heptasaccharide can be calculated as the maltooligosaccharide content. The "monosaccharide and disaccharide" shown in Table 2 below indicates the contents of all monosaccharides and disaccharides contained in maltooligosaccharide.

In Example 1, the compositions were prepared by adjusting the mixing ratio of low DE starch syrup and allulose syrup, to be higher gradually allulose content ratio from sample 1 to sample 4. The low DE starch syrup having 75 brix, and the allulose syrup having 70 brix and 95 wt % of allulose purity were used. Specifically, in the composition of Table 1, based on a total 100 wt % including the starch syrup solid content (wt %) of sample 1 and the allulose content (wt %) of the allulose syrup, sample 1 had a starch syrup solid content of 92.7 w/w % and an allulose solid content of 7.3 w/w %, sample 2 had a starch syrup solid content of 84.9 w/w % and an allulose solid content of 15.1 w/w %, sample 3 had a starch syrup solid content of 76.6 w/w % and an allulose solid content of 23.4 w/w %, sample 4 had a starch syrup solid content of 58.4 w/w % and the allulose solid content of 41.6 w/w %.

The raw material sample for spray drying according to sample 1 of Example 1 was 53.6 Brix, the raw material sample for spray drying according to sample 2 of Example 1 was 53.4 Brix, the raw material sample for spray drying according to sample 3 of Example 1 was 53.9 Brix, and the raw material sample for spray drying according to sample 4 of Example 1 was 53.6 Brix.

TABLE 1

| Item | Comparative sample 1 | Sample 1 | Sample 2 | Sample 3 | Sample 4 |
|---|---|---|---|---|---|
| Low DE starch syrup (liquid) | 64.85 | 59.28 | 53.39 | 47.33 | 34.74 |
| Allulose syrup (liquid) | 0 | 5.29 | 10.72 | 16.30 | 27.90 |
| Sodium caseinate | 2.16 | 2.20 | 2.23 | 2.26 | 2.32 |
| Hydrogenated palm oil | 30.30 | 30.77 | 31.17 | 31.59 | 32.45 |
| Dibasic potassium phosphate | 1.82 | 1.85 | 1.87 | 1.90 | 1.95 |
| Potassium polyphosphate | 0.35 | 0.35 | 0.36 | 0.36 | 0.37 |
| Emulsifier (DMG) | 0.52 | 0.26 | 0.27 | 0.27 | 0.28 |
| Total (wt %) | 100 | 100 | 100 | 100 | 100 |

TABLE 2

| Category | (Low-DE starch syrup) wt % |
|---|---|
| DE value | 22.5 |
| 8-or higher saccharide | 29.1 |
| 7-saccharide | 3.3 |
| 6-saccharide | 20.1 |
| 5-saccharide | 14 |
| 4-saccharide | 6.2 |
| 3-saccharide | 13.4 |
| 1-saccharide and 2-saccharide | 13.9 |

1-2: Preparation of Powder Creamer

The raw material sample prepared in Example 1-1 was spray-dried in order to evaluate the suitability for powdering in the process of spray-drying.

Specifically, the liquid sample, which is the raw material of the powder drying, was sprayed by a spray dryer (manufacturer: GEA Niro, model name HKC-100-DJ) using a two-fluid nozzle type atomizer. The powder was produced under the condition where the inlet temperature of the hot air inside the atomizer was maintained at 130 to 170° C., and the hot air temperature of the outlet was maintained at 85 to 100° C. The solid content and composition ratio of each component in the powdery emulsions of the prepared control sample 1 and samples 1 to 4 are shown in Table 3 below.

TABLE 3

| Item | Comparative sample 1 | Sample 1 | Sample 2 | Sample 3 | Sample 4 |
|---|---|---|---|---|---|
| Solid content of low DE starch syrup | 58.05 | 53.19 | 47.99 | 42.63 | 31.41 |
| Solid content of allulose syrup | 0 | 4.43 | 9.00 | 13.70 | 23.55 |
| Sodium caseinate | 2.58 | 2.63 | 2.67 | 2.71 | 2.79 |
| Hydrogenated palm oil | 36.17 | 36.81 | 37.36 | 37.93 | 39.12 |
| Dibasic potassium phosphate | 2.17 | 2.21 | 2.24 | 2.28 | 2.35 |
| Potassium polyphosphate | 0.41 | 0.42 | 0.43 | 0.43 | 0.45 |
| Emulsifier (DMG) | 0.62 | 0.32 | 0.32 | 0.33 | 0.34 |
| Total (wt %) | 100 | 100 | 100 | 100 | 100 |

Comparative Example 1: Preparation of Powder Creamer

For the control sample of Comparative Example 1, a powdery emulsion composition was prepared in substantially the same manner as in Example 1, but a low DE starch syrup (DE 20-25) was used in an amount of 64.85 wt % without containing allulose used in Example 1, the sugar composition of low DE starch syrup is shown in Table 2 above, and the specific composition of the control sample is shown in Table 1 above. The solid content of the raw liquid composition of Comparative Example 1 was 53.1 Brix.

Specifically, the mixed solution, which was the raw material of the powder drying, was sprayed by a spray dryer (manufacturer: GEA Niro, model name HKC-100-DJ) using a two-fluid nozzle type atomizer. The powder was produced under the condition where the inlet temperature of the hot air inside the atomizer was maintained at 130 to 170° C., and the outlet temperature of hot air was maintained at 85 to 100° C.

Example 2: Analysis of Emulsion Stability

The emulsion stability of the raw material liquid sample for creamer production obtained in Example 1 and Comparative Example 1 was evaluated while being left at room temperature for 28 hours. After the storage time of 24 hours has passed, the photographs of the raw material liquid sample are shown in FIGS. 1 (Example 1) and 2 (Comparative Example 1).

Specifically, the evaluation of emulsion stability was conducted by looking for fisheye (non-emulsified fat spots floating on the surface of beverages), feathering (particles not completely dissolved), and oil-water separation after being left for a certain period of time.

As shown in the experimental results of FIG. 1, while the powdery emulsified composition is left at room temperature, the phase separation was measured according to the leaving time. It is confirmed that in Comparative Example 1 is not good for the emulsion stability is not good, and that the emulsion composition containing allulose according to Example exhibited the equivalent or slightly increased emulsion stability at room temperature, although the content of the used emulsifier is reduced to about 50%.

Example 3: Analysis of Preparation Characteristics of Powder Creamer

In order to evaluate the suitability for powdering in the process of spray-drying the raw material liquid sample for preparing a creamer prepared in Example 1 and Comparative Example 1, spray drying was performed in the same manner as in Example 1, respectively.

In the powdering process of the spray drying method, the spray-drying properties were analyzed with the naked eye according to the degree of adhesion to the inside of the machine (caking phenomenon) during spray-drying of the liquid phase for powder production. Further, a photograph showing a powdering process of spray drying for the raw material liquid sample to prepare a creamer prepared in Example 1 and Comparative Example 1 is shown in FIG. 3. Further, a photograph of the sample 4 of Example 1 and the control sample of Comparative Example 1 during the powdering process is shown in FIG. 4.

As shown in FIG. 3, when comparative example 1 (control sample 1) using low DE starch syrup alone and a specific composition including low DE starch syrup and allulose was used, as the content of allulose increases, the water could not evaporate and solidified to cause agglomeration. Therefore, it is preferable to use an appropriate amount of allulose. As shown in FIG. 4, Sample 4 of Example 1 showed that when the raw liquid emulsion sample was sprayed, the water did not evaporate immediately and was accumulated on the wall. Thus, it was confirmed that the drying was insufficient, the high allulose content made spray-rying difficult, and the amount of adhesion inside the machine was high due to severe caking. Thus, the spray-drying was not good.

Therefore, it was confirmed that when allulose alone or allulose being higher than a certain amount was used as a saccharide, powdering by spray drying was difficult. Thus, the allulose content in the saccharide contained in the creamer composition must be 50% or less.

Example 4: Analysis of Color Value of Powder Creamer

The creamer powders prepared in Example 1 and Comparative Example 1 were analyzed for color value using a hunter colorimeter. Specifically, for the creamer powders prepared in Example 1 and Comparative Example 1, the color value evaluation was repeated to obtain the average value, as shown in Table 4 below.

The chromaticity was measured using a colorimeter (CM-3500d, Konica Minolta, Osaka, Japan). In the chromaticity analysis, the L value indicating the brightness, the a value indicating the redness (−) and the greenness (+), and the b value indicating the yellowness were measured, and the average value of the measured chromaticity was calculated and shown in Table 4 below.

TABLE 4

| Category | L | a | b | ΔE |
|---|---|---|---|---|
| Comparative Example 1 | 0.85 | −0.15 | −0.19 | 98.94 |
| Example 1-sample 1 | 0.76 | 0.10 | −0.07 | 99.03 |
| Example 1-sample 2 | 0.79 | 0.04 | −0.39 | 99.00 |
| Example 1-sample 3 | 0.96 | −0.21 | −0.25 | 98.83 |

As shown in the results of Table 4, a slight difference in color value appears in the creamer powder after spray drying, which was affected by the browning effect of allulose, but by considering the use of coffee creamer, it was evaluated as the equivalent level that did not make a large difference in use.

Example 5: Analysis of Calories of Emulsion Composition

The calories of samples 1 to 4 of Example 1 and the sample emulsion composition of Comparative Example 1 were calculated based on a solid content. The calculated calories (kcal/100 mL) are shown in Table 5 below.

TABLE 5

| Component | Comparative Example 1 | Example 1-sample 1 | Example 1-sample 2 | Example 1-sample 3 | Example 1-sample 4 |
|---|---|---|---|---|---|
| calory (kcal/100 mL) | 475.89 | 465.67 | 453.91 | 441.86 | 416.71 |

As shown in the calorie results in Table 5, it can be confirmed that the emulsion compositions of samples 1 to 4 of Example 1 have significantly lower calories than Comparative Example 1, and it has the effect of reducing calories while replacing the existing starch syrup.

Example 6: Preparation of Liquid Coffee and Analysis of Physical Properties

The creamer powders prepared in Example 1 and Comparative Example 1 were mixed with an instant coffee powder to prepare a liquid coffee. Specifically, 1 g of coffee powder (Dongseo Food), 6 g of coffee creamer powder, 6 g of sugar, and 80 g of water were mixed to prepare a liquid coffee. A photograph of the prepared liquid coffee sample is shown in FIG. 5.

As shown in FIG. 5, as a result of preparing the coffee mix using the creamer sample, no color difference was observed with the naked eye and there is no significant difference in the value of ΔF in the color value analysis, thereby almost no color difference between the samples. It is confirmed that the emulsion composition containing allulose according to Example has enhanced emulsion stability at room temperature, and even when making coffee, it shows a color similar to the existing one even with a sugar-reducing effect.

Examples 7 to 10: Preparation of Liquid Emulsion Composition Using Allulose

Specific components and the content of each component for the preparation of the creamer emulsion composition are shown in Table 6 below. According to the content shown in Table 6, hydrogenated palm oil and glycerin fatty acid ester as an emulsifier were mixed and heated and mixed under conditions of 70° C. or more, to prepare an oil phase part. Allulose syrup (allulose purity 95 wt %, 70 Brix) was mixed with sodium caseinate, dibasic potassium phosphate and potassium polyphosphate, and the mixture was stirred at 75° C. or more to prepare a water phase part. While putting the oil phase part into the water phase part, they were mixed with a homomixer under conditions of 6,000 rpm or more for 5 minutes or more. Then, secondary mixing was performed under high pressure conditions using a homogenizer, and the solid content was adjusted to 45 to 50 Brix by adding water to prepare a liquid emulsion composition.

TABLE 6

| Component | Comparative Example 2 | Example 7 | Example 8 | Example 9 | Example 10 |
|---|---|---|---|---|---|
| Low DE starch syrup | 64.85 | 45.59 | 28.54 | 13.45 | 0.00 |
| Liquid allulose | 0.00 | 21.71 | 40.76 | 57.62 | 72.64 |
| Sodium caseinate | 2.16 | 2.03 | 1.90 | 1.79 | 1.70 |
| Hydrogenated palm oil | 30.30 | 28.40 | 26.66 | 25.13 | 23.76 |
| Dibasic potassium phosphate | 1.82 | 1.70 | 1.60 | 1.51 | 1.43 |
| Potassium polyphosphate | 0.35 | 0.32 | 0.30 | 0.29 | 0.27 |
| Emulsifier | 0.52 | 0.24 | 0.23 | 0.22 | 0.20 |
| Total | 100.00 | 100.00 | 100.00 | 100.00 | 100.00 |

Comparative Example 2: Preparation of Emulsion Composition Using Low DE Starch Syrup An emulsion composition was prepared by using only a low DE starch syrup (DE 20 to 25) available from Samyang Corporation, instead of allulose syrup and low DE starch syrup used in Example 7. Specifically, the low DE starch syrup (DE 20 to 25) was prepared by the following method and has the sugar composition shown in Table 7. The components and contents of the emulsion composition prepared using the low DE starch syrup of Comparative Example 2 are shown in Table 6 above.

The low DE starch syrup (DE 20 to 25) available from Samyang Corporation was obtained by mixing 1000 g of corn starch with 2500 g of water, performing a high-temperature liquefaction reaction at 110° C. through a hydroheater, and then passing through a hydroheater at a temperature of 130 to 140° C. to inactivate the liquefying enzyme. Then, the temperature of the product was lowered to 61° C. through a heat exchanger, and then was reacted to DE 20 to 24 using a liquefying enzyme of a-amylase (Liquozyme Supra) used in the liquefaction reaction. Activated carbon was added in an amount of 0.1 to 0.8 wt % based on the solid content, and the mixture was stirred for 30 minutes or more. Then, the activated carbon was removed through a filter press, and then ion purification and concentration were performed to obtain 2000 g of low DE starch syrup. The saccharide composition of the obtained low DE starch syrup is shown by the percentage by weight of solid content in Table 7 below.

Table 7 below shows the percentage by weight of solid content of the saccharide compositions of ion starch syrup in Comparative Examples 2 and 3, and low DE starch syrup. In Table 7, the content of trisaccharide to heptasaccharide can be calculated as the maltooligosaccharide content. The "monosaccharide and disaccharide" shown in Table 7 indicates the contents of all monosaccharides and disaccharides contained in maltooligosaccharide.

TABLE 7

| Category | DE value | 8-saccharide | 7-saccharide | 6-saccharide | 5-saccharide | 4-saccharide | 3-saccharide | 1-saccharide and 2-saccharide |
|---|---|---|---|---|---|---|---|---|
| Comparative Example 2 (low DE starch syrup) | 22.5 | 29.1 | 3.3 | 20.1 | 14 | 6.2 | 13.4 | 13.9 |
| Comparative Example 3 (ion starch syrup) | 42.2 | 21.9 | 2 | 3.6 | 5.6 | 6.1 | 17.6 | 43.2 |

Comparative Example 3: Preparation of Emulsion Composition Using Ion Starch Syrup An emulsion composition was prepared using only an ion starch syrup (DE 42) available from Samyang Corporation instead of the allulose syrup and low DE starch syrup used in Example 7. Specifically, the ion starch syrup (DE 42) was prepared by the following method and has the saccharide composition shown in Table 7.

The ion starch syrup (DE 42) available from Samyang Corporation was obtained by mixing 1000 g of corn starch with 2500 g of water, performing a high-temperature liquefaction reaction at 110° C. through a hydroheater, and then passing through the hydroheater at 130° C. to 140° C. to inactivate the liquefied enzyme. Then, the temperature of the product was lowered to 61° C. through a heat exchanger, and then and then reacted to DE 40 to 45 using glycosylation enzymes of Maltogenase (Novozyme) and Pullulanase (Novozyme, Promozyme D2). Activated carbon was added in an amount of 0.1 to 0.8 wt % based on the solid content, and the mixture is stirred for 30 minutes or more. Then, the activated carbon was removed through a filter press, and then ion purification and concentration are performed to obtain 2000 g of ion sugar starch. The sugar composition of the obtained ion starch syrup is shown by solid content wt. % in Table 7 below.

Example 11: Analysis of Calories of Emulsion Composition

The calories of the sample emulsion compositions of Examples 7 to 10 and Comparative Example 2 were calculated based on the solid content, and the calorie of allulose is calculated as 0.0 kcal/g. The measured calories are shown in Table 8 below.

TABLE 8

| Component | Comparative Example 2 | Example 7 | Example 8 | Example 9 | Example 10 |
|---|---|---|---|---|---|
| Calory (kcal) | 475.89 | 409.17 | 349.46 | 296.73 | 249.70 |

It can be confirmed that the emulsion compositions of Examples 7 to 10 have significantly lower calories as compared with Comparative Example 1 and thus, has the effect of reducing calories while being able to replace the existing starch syrup.

Example 12: Measurement of Solubility According to Temperature of Emulsion Composition In order to confirm the solubility of the emulsion composition in water, the solubility in water was measured and compared for the emulsion compositions of Comparative Example 2 using low DE starch syrup and Examples 7 to 10 in which 50% of low DE starch syrup was replaced with allulose. The temperature of water was set to a low temperature condition of 4° C. and a high temperature condition of 85° C., and the emulsion composition was dissolved and the weight of the precipitate was measured to determine the dissolution rate.

Specifically, 15 g of each liquid samples of Examples 7 to 10 and Comparative Example 2 was taken and was added to 100 mL of purified water under low temperature conditions of 4° C. and high temperature conditions of 85° C., and the mixture was stirred at 180 rpm for 10 minutes. 150 mL of the mixture was injected into a conical tube, and centrifugated at 4,000 rpm for 10 minutes, and then the supernatant was removed to measure the weight (g) of the remaining precipitate. The measured weight (g) of precipitate was applied to the following Equation 1 to obtain a solubility percentage (%). The measured solubility values of the emulsion composition are shown in Table 9 and FIG. 6.

Equation 11

Solubility (%)=50 g/weight of precipitate (g) X 100

TABLE 9

| Category | Control group | Experimental group 1 | Experimental group 2 | Experimental group 3 | Experimental group 4 |
|---|---|---|---|---|---|
| Low temperature | 91.93 | 94.07 | 95.09 | 94.98 | 95.16 |
| High temperature | 93.42 | 96.20 | 96.18 | 97.44 | 98.53 |

As shown in Table 9, it can be confirmed that the coffee creamer using allulose shows increased solubility at low and high temperatures. In particular, it can be confirmed that as the content of allulose increases, its solubility increases. Thus, it is possible to prepare a coffee creamer having fast melting property by using allulose as compared with existing saccharides (other than low DE starch syrup).

Example 13: Measurement of Solubility According to pH of Emulsion Composition According to substantially the same manner for the solubility measurement under a high temperature condition of 85° C. in Example 12, the the solubility measurement was performed, except that the experiments were carried out with pH 3, pH 6, and pH 9, respectively. The results are shown in Table 10 below.

TABLE 10

| pH condition | Comparative Example 2 | Example 8 |
|---|---|---|
| pH3.0 | 94.67 | 96.07 |
| pH6.0 | 95.56 | 95.97 |
| pH9.0 | 95.02 | 96.11 |

As shown in Table 10, it can be confirmed that a coffee creamer using allulose according to the present disclosure exhibits equivalent or slightly higher solubility in a pH range including acidic, weak acidic and alkaline conditions, as compared with Comparative Example 1 in which a coffee creamer uses low DE starch syrup. Thus, it can be used easily in various pH ranges.

Examples 14 to 18: Mixing of Emulsified Source Compositions

Soybean oil and allulose syrup were added to egg yolk at the contents shown in Table 11 below, and then salt, vinegar, and purified water were mixed to prepare a mixed solution. While mixing the prepared mixed solution with a hand blender, soybean oil was added at divided amounts after soybean oil weighs the total amount to be added and was arbitrarily divided into 4 portions, and emulsified to prepare an emulsified sauce.

The allulose syrup was used as an allulose syrup of 95% allulose purity, 70 Brix, pH 4.41, the color value (absorbance, 420 nm) of 0.039 IU, and the electrical conductivity of 15.13 μS/cm. The pH, absorbance and electrical conductivity of the allulose syrup were measured as follows. Allulose syrup was diluted to 30 Brix, and was measured for the absorbance at a wavelength of 420 nm using a spectrophotometer. When the color value was measured as absorbance at 420 nm using a spectrophotometer, yellow to brown color was absorbed at 420 nm, to confirm the degree of browning. Using the absorbance value measured at the wavelength, an IU (Icumsa Unit) for determining the degree of browning or color depth of the liquid saccharide can be calculated. For pH analysis, allulose syrup was diluted to 10 Brix and the pH of the syrup was analyzed using a pH meter (SCHOTT Lab850). Electrical conductivity was measured using an InLab 731 ISM electrode in a SevenExcellence instrument from METTLER TOLEDO.

The composition of Table 11 below shows the content of each component in wt % based on 100 wt % of the emulsified source composition.

TABLE 11

| Component (wt %) | Comparative Example 4 | Comparative Example 5 | Example 14 | Example 15 | Example 16 | Example 17 | Example 18 |
|---|---|---|---|---|---|---|---|
| Egg yolk (liquid) | 13.6 | 5 | 9 | 8 | 6 | 5 | 3 |
| sugar | — | 8.6 | — | — | — | — | — |
| Allulose Syrup (liquid) | — | — | 5 | 5.6 | 6 | 8.6 | 10.6 |
| Soybean oil | 72.7 | 72.7 | 72.7 | 72.7 | 72.7 | 72.7 | 72.7 |
| Vinegar | 4.5 | 4.5 | 4.5 | 4.5 | 4.5 | 4.5 | 4.5 |
| Salt | 2.3 | 2.3 | 2.3 | 2.3 | 2.3 | 2.3 | 2.3 |
| Purified water | 6.9 | 6.9 | 6.5 | 6.9 | 8.5 | 6.9 | 6.9 |
| Total | 100 | 100 | 100 | 100 | 100 | 100 | 100 |

Comparative Examples 4 and 5

The emulsified sauce composition of Comparative Example 4 was different from Example 14 that it did not contain the allulose syrup but contained egg yolk an amount of 13.6 wt %, and the remaining components and compositions were prepared substantially in the same as the emulsified source composition of Example 1.

The emulsified sauce composition of Comparative Example 5 was different from Example 14 that it did not contain the allulose syrup, but contained 8.6 wt % of sugar and 5.0 wt % of egg yolk, and the remaining components and compositions were prepared substantially in the same as the emulsified source composition of Example 14.

Example 19: Evaluation of the Time Required for Emulsification of an Emulsified Source Composition This was the time measured on a 200 g manufacturing basis on a lab scale using a hand blender, and the relative the time required for emulsification was expressed by converting the time required for emulsification of the sample, based on 100% of the time required for emulsification of Comparative Example 4.

TABLE 12

| Sample | Time required for emulsification (min) | Relative time required for emulsification (%) |
|---|---|---|
| Comparative Example 4 | 8 | 100% |
| Comparative Example 5 | 10 | 125% |
| Example 14 | 6 | 75.0% |
| Example 15 | 5.8 | 72.5% |
| Example 16 | 5.7 | 71.3% |
| Example 17 | 5 | 62.5% |
| Example 18 | 4.5 | 56.3% |

As shown in the measurement result of the time required for emulsification in Table 12, as the ratio of the allulose content to the egg yolk content or the allulose content contained in the emulsified sauce composition increased, the emulsification proceeded rapidly, thereby reducing the time required for emulsification. That is, the time required for emulsification was reduced in inverse proportion to the ratio of the allulose content to the egg yolk content or the allulose content. The time required for emulsification of the emulsified source composition of Comparative Example 4 including only egg yolk was set to 100, and the relative time required for emulsification of the emulsified source composition was reduced to 80% or less, or 75% or less. The difference in the emulsification time of the emulsified source composition according to the allulose content will show a larger difference for the product manufactured in an industrial scale, which can have a huge impact on productivity.

Further, the emulsified sauce composition of Comparative Example 5 using sugar instead of allulose had the ratio of the sugar solid content to the egg yolk content of 1.72, the time required for emulsification was 125% relative to the time required for emulsification of Comparative Example 4, which takes almost twice longer time as compared to the relative time required for emulsification of 62.5% in the emulsified source composition of Example 17 in which the ratio (liquid/liquid) of allulose syrup content to the egg yolk content was 1.72. That is, when allulose was used in the preparation of the emulsified source composition according to the present disclosure, it was confirmed that emulsification proceeded faster than sugar, and the time required for emulsification was shortened. The time required for emulsification of such an emulsion composition will act as a factor influencing the production yield and process time when the product is manufactured on an industrial scale.

Example 20: Measurement of Viscosity of Emulsified Source Composition 40 g of the emulsified source samples prepared according to Examples 14 to 18 and Comparative Examples 4 to 5 were poured in a 500 mL beaker, and the viscosity of the emulsified source composition was measured using a rotary viscometer (Model RV. Brookfield Engineering Laboratories, Inc., USA) while maintaining the temperature at 25° C. At this time, the viscosity was measured by using spindle of No. 64 at 30 rpm. The measured viscosity (cp) of the emulsified source composition is shown in Table 13 below.

TABLE 13

| Sample | Viscosity (cp) |
| --- | --- |
| Comparative Example 4 | 624,000 |
| Comparative Example 5 | 157,000 |
| Example 14 | 175,500 |
| Example 15 | 157,667 |
| Example 16 | 150,833 |
| Example 17 | 102,000 |
| Example 18 | 58,000 |

As shown in the viscosity measurement results of the emulsified source composition in Table 13, it was confirmed that in Comparative Example 4, the excessive high content of the egg yolk made the bight viscosity, and the deficient fluidity, which makes it difficult to use the sauce. The viscosities of the emulsified source compositions of Examples 14 to 18 satisfied the appropriate viscosity range for use in cooking or intake of users, and was close to the numerical range of the viscosity of commercially available mayonnaise. Additionally, the emulsified sauce compositions according to Examples 14 to 18 containing allulose had good spreadability and thus increased convenience in use.

Test Example 3: Measurement of Oil Separation Degree of Emulsified Source Composition For the emulsified sauces prepared according to Examples 14 to 18 and Comparative Examples 4 to 5, −20° C. and 25° C. were alternately repeated at 12 hour intervals, and the amount of oil separated for 24 hours interval was measured to evaluate the phase stability or phase separation degree. The oil separation degree (%) of the sample is shown in Table 14 below as a percentage (%) value of the value obtained by dividing the oil amount (weight, g) of the phase-separated in upper layer part by the total amount (weight, g) of the sample.

TABLE 14

| Sample | Oil separation degree after 24 hours (%) | Oil separation degree after 48 hours (%) | Oil separation degree after 72 hours (%) |
| --- | --- | --- | --- |
| Comparative Example 4 | 0 | 0 | 0.3 |
| Comparative Example 5 | 0 | 0.3 | 1.4 |
| Example 14 | 0 | 0 | 0.38 |
| Example 15 | 0 | 0 | 0.38 |
| Example 16 | 0 | 0 | 0.39 |
| Example 17 | 0 | 0.1 | 0.44 |
| Example 18 | 0 | 0.1 | 0.72 |

As shown in the measurement results of the oil separation degree of the emulsified source composition of Table 14, the emulsified source compositions of Examples 14 to 18 using allulose showed better emulsion stability as compared with Comparative Example 5 using sugar. Except for Comparative Example 5 using sugar, the samples of Examples 14 to 18 using allulose had a low degree of oil separation, which was similar to Comparative Example 4 having a high egg yolk content of 13.6 wt %, and the separated oil amount of 1.2% or less, preferably 1% or less, to confirm the emulsion stability.

On the other hand, it was confirmed that the amount of separated oil in Comparative Example 5 in which allulose was replaced with sugar was as high as 1.4%, to confirm the low emulsion stability. Specifically, in the emulsified sauce composition of Comparative Example 5 using sugar instead of allulose in the emulsified sauce composition of Example and having the ratio of sugar solid content to the egg yolk content of 1.72, it has the degree of separation of oil after 48 hours of 1.4%, which showed the separation degree of almost 3 time, as compared to the degree of oil separation after 48 hours of 0.44% for the emulsified sauce composition in Example 17 having ratio of allulose syrup content to egg yolk content of 1.72. This means that the emulsion stability of the emulsified sauce composition of Comparative Example 5 is very low. By considering the measured amount of oil separation or oil separation degree of the emulsified source samples, allulose as a saccharide used in the preparation of the emulsified sauce composition, exhibited about twice or more emulsion stability than sugar.

The invention claimed is:

1. A powdery creamer composition comprising
a spray-dried product of a liquid raw material comprising vegetable oil, saccharide and emulsifier,
wherein the saccharide comprises allulose and starch syrup,
wherein the solid content of allulose is 1 to 40 wt % based on 100 wt % of the saccharide solid content including allulose and starch syrup, and
wherein the starch syrup has a dextrose equivalent (DE) value of 20 to 25.

2. The powdery creamer composition according to claim 1, wherein a viscosity of 2,900 to 5,200 cps as measured at a temperature of 30° C. for a 72 Brix syrup solution.

3. The powdery creamer composition according to claim 1, wherein the DE value of the liquid raw material is 10 to less than 44.

4. The powdery creamer composition according to claim 1, wherein the liquid raw material is added by water to have a solid content (brix) of 30 to 80 wt % and is spray-dried to produce the spray-dried product.

5. The powdery creamer composition according to claim 1, wherein the solid content of allulose is 30 wt % or less, based on 100 wt % of the saccharide solid content including allulose and starch syrup.

6. The powdery creamer composition according to claim 1, wherein the solid content of the saccharide including starch syrup and allulose is contained in an amount of 35 to 70 wt % based on 100 wt % of the liquid raw material.

7. The powdery creamer composition according to claim 1, wherein the vegetable oil is contained in an amount of 25 to 45 wt % based on 100 wt % of the liquid raw material.

8. The powdery creamer composition according to claim 1, wherein the powdery creamer composition further comprises at least one selected from the group consisting of phosphate, a casein salt, an emulsion stabilizer, a dairy product, a flavor and a pigment.

9. The powdery creamer composition according to claim 1, which is a particle or granule in 100 μm to 300 μm.

10. The powdery creamer composition according to claim 1, wherein the powder creamer composition further comprises an anti-caking agent selected from the group consisting of nondigestible maltodextrin (NMD), polydextrose, dextrin, and maltooligosaccharide.

11. The powdery creamer composition according to claim 1, wherein at least one selected from the group consisting of a high-intensity sweetener and a sugar is further comprised in the liquid raw material.

* * * * *